Aug. 27, 1963          W. McK. MARTIN          3,101,752
                     ASEPTIC FILLING MACHINE
Filed Aug. 1, 1960                          15 Sheets-Sheet 2

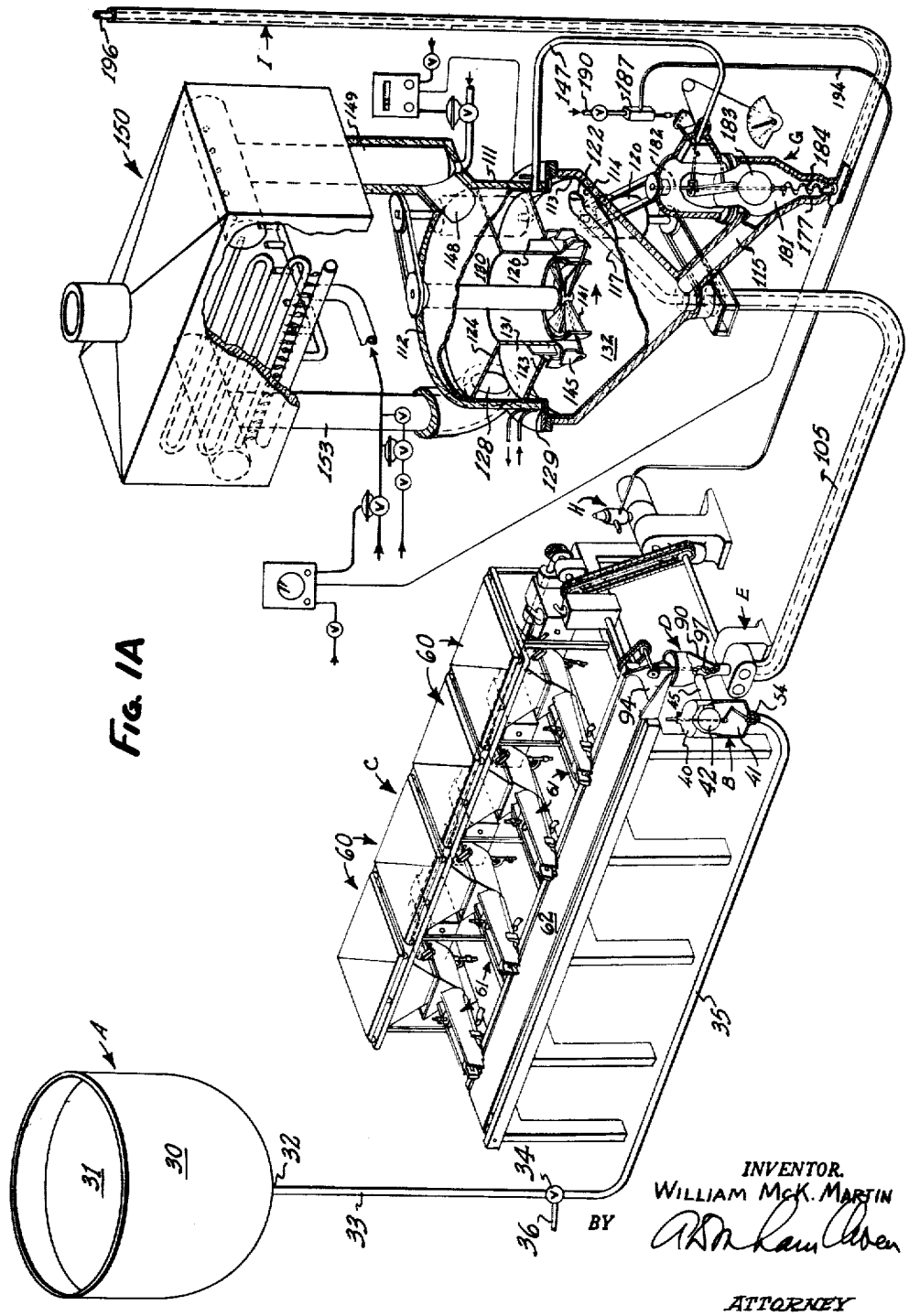

INVENTOR.
WILLIAM McK. MARTIN
BY
ATTORNEY

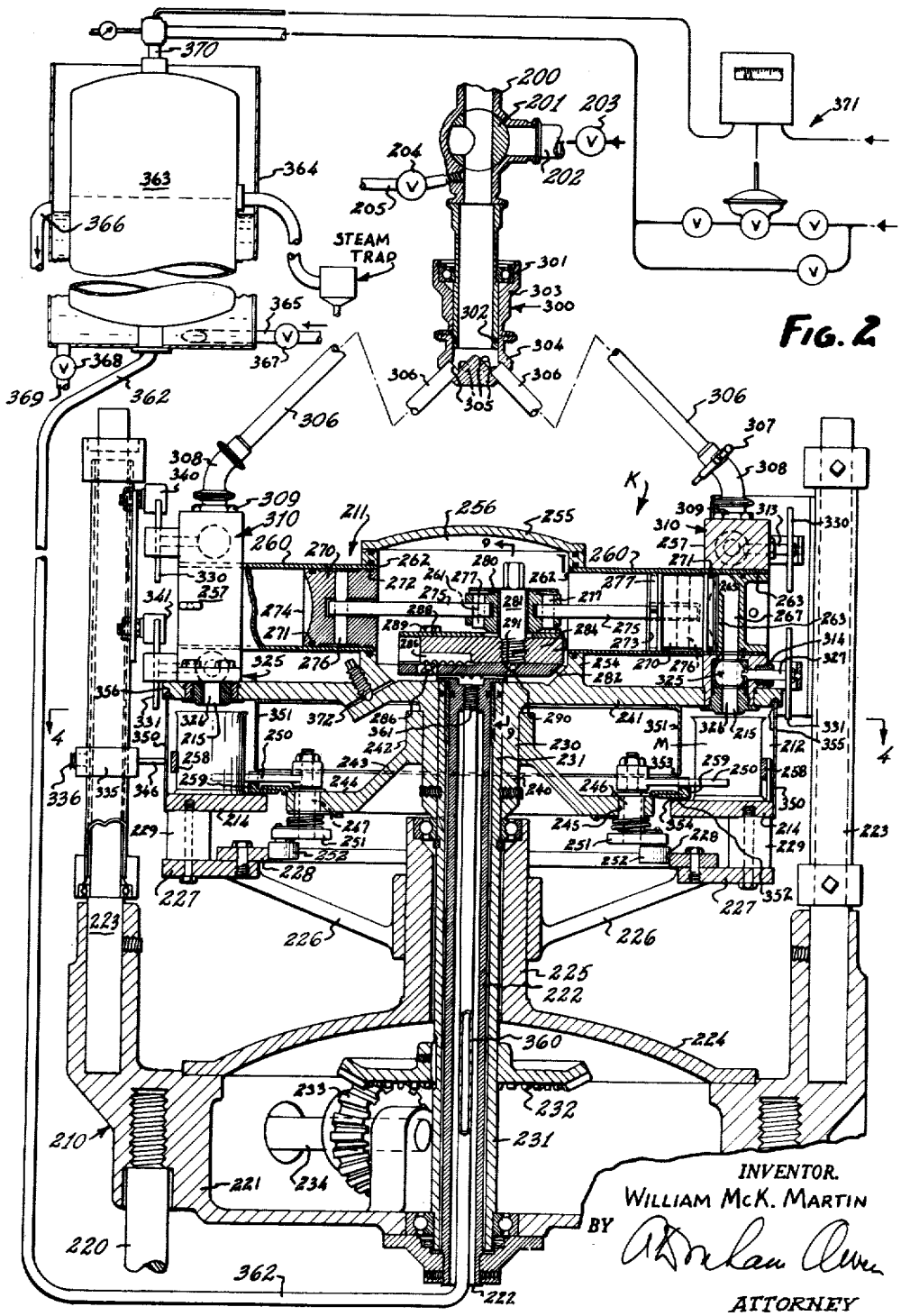

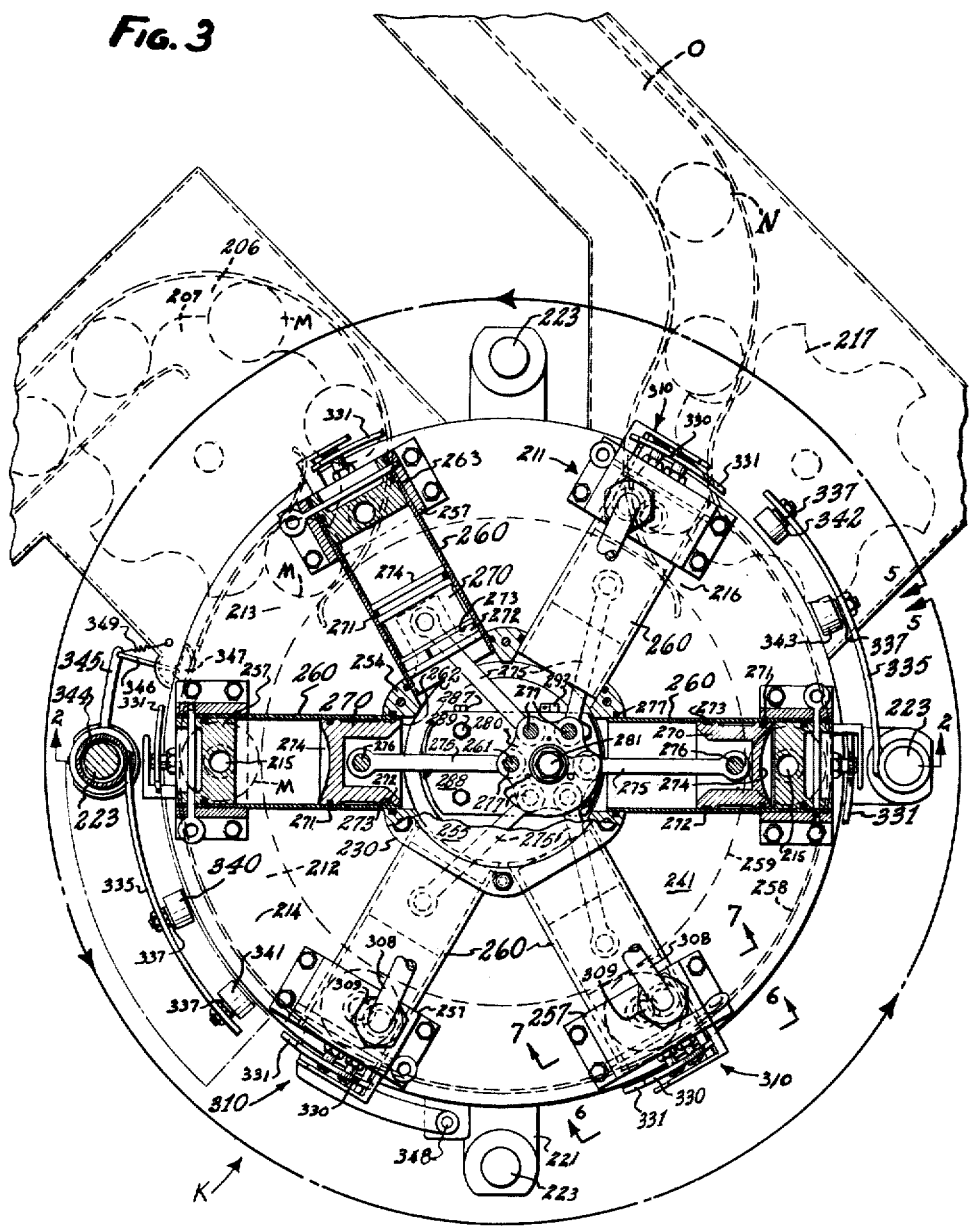

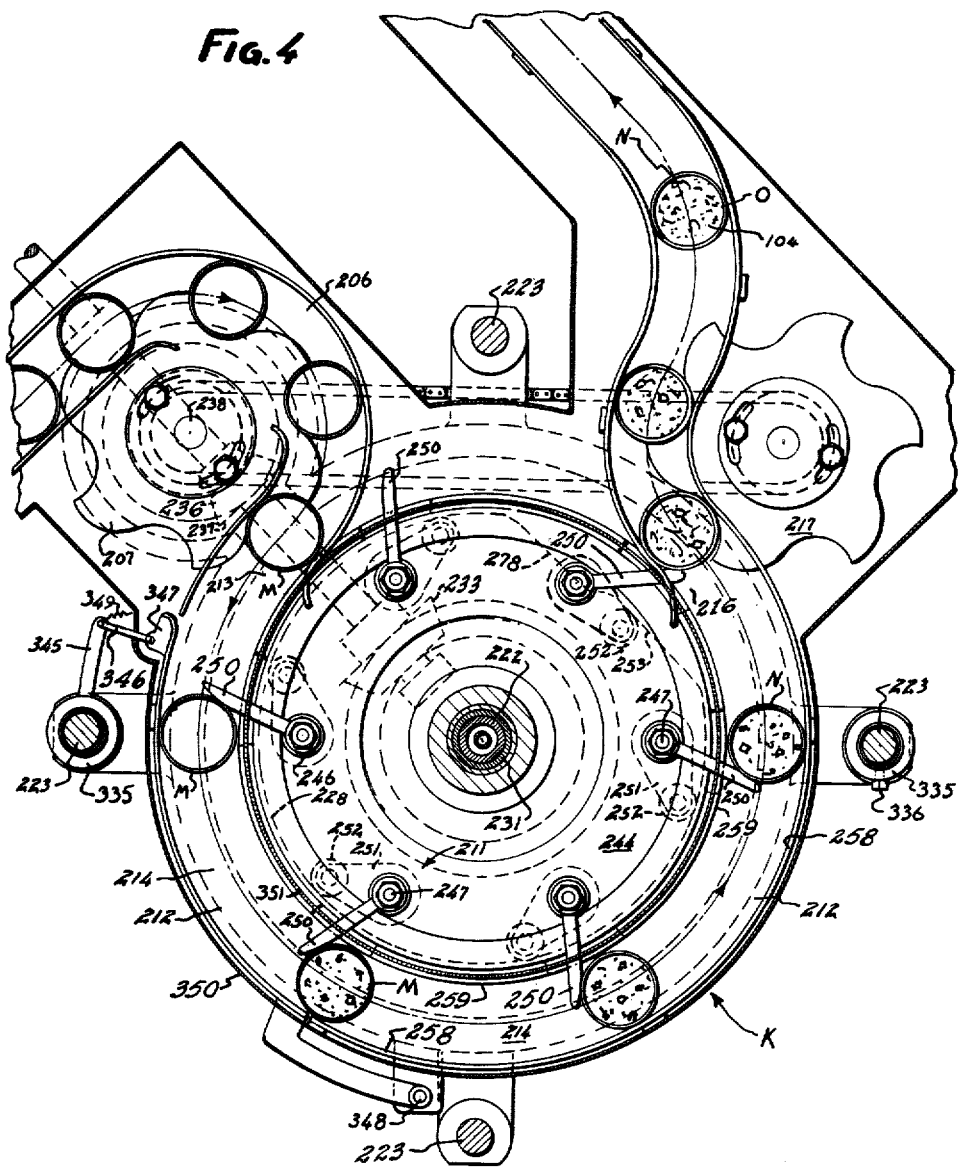

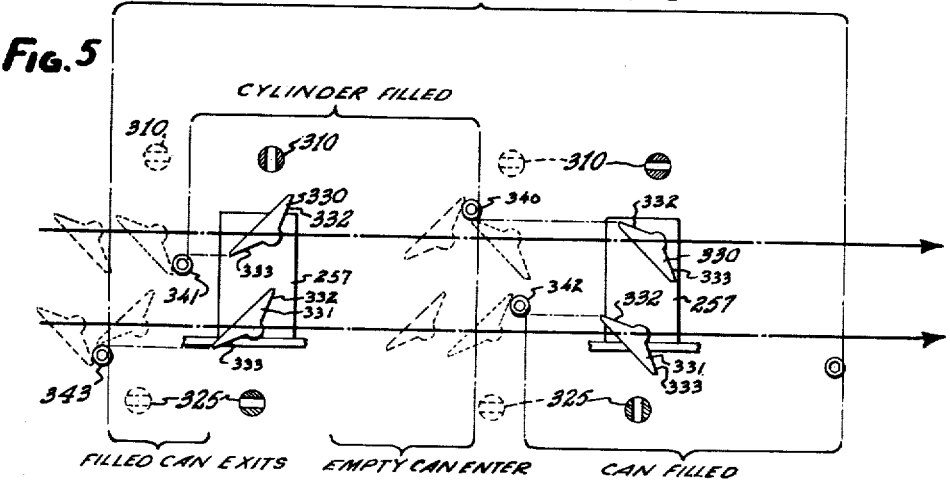
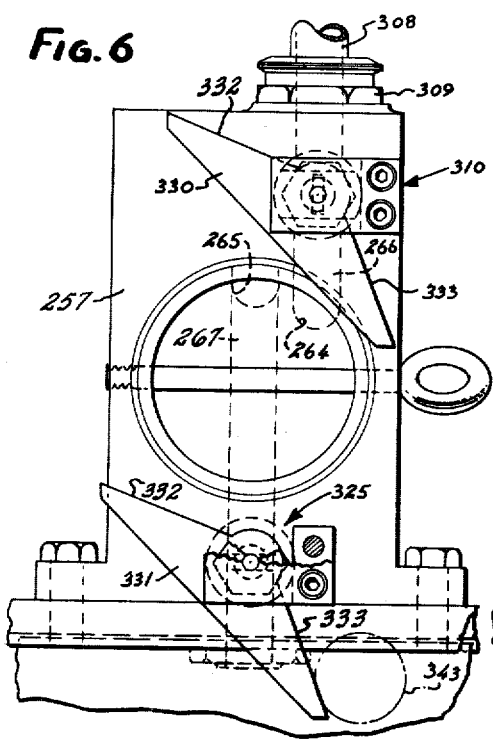
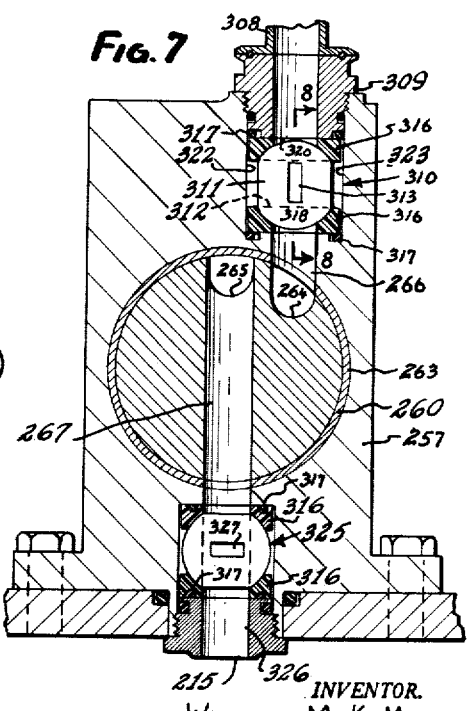

Aug. 27, 1963

W. McK. MARTIN 3,101,752

ASEPTIC FILLING MACHINE

Filed Aug. 1, 1960

INVENTOR.
WILLIAM McK. MARTIN
BY
ATTORNEY

Aug. 27, 1963 W. McK. MARTIN 3,101,752
ASEPTIC FILLING MACHINE
Filed Aug. 1, 1960 15 Sheets-Sheet 9
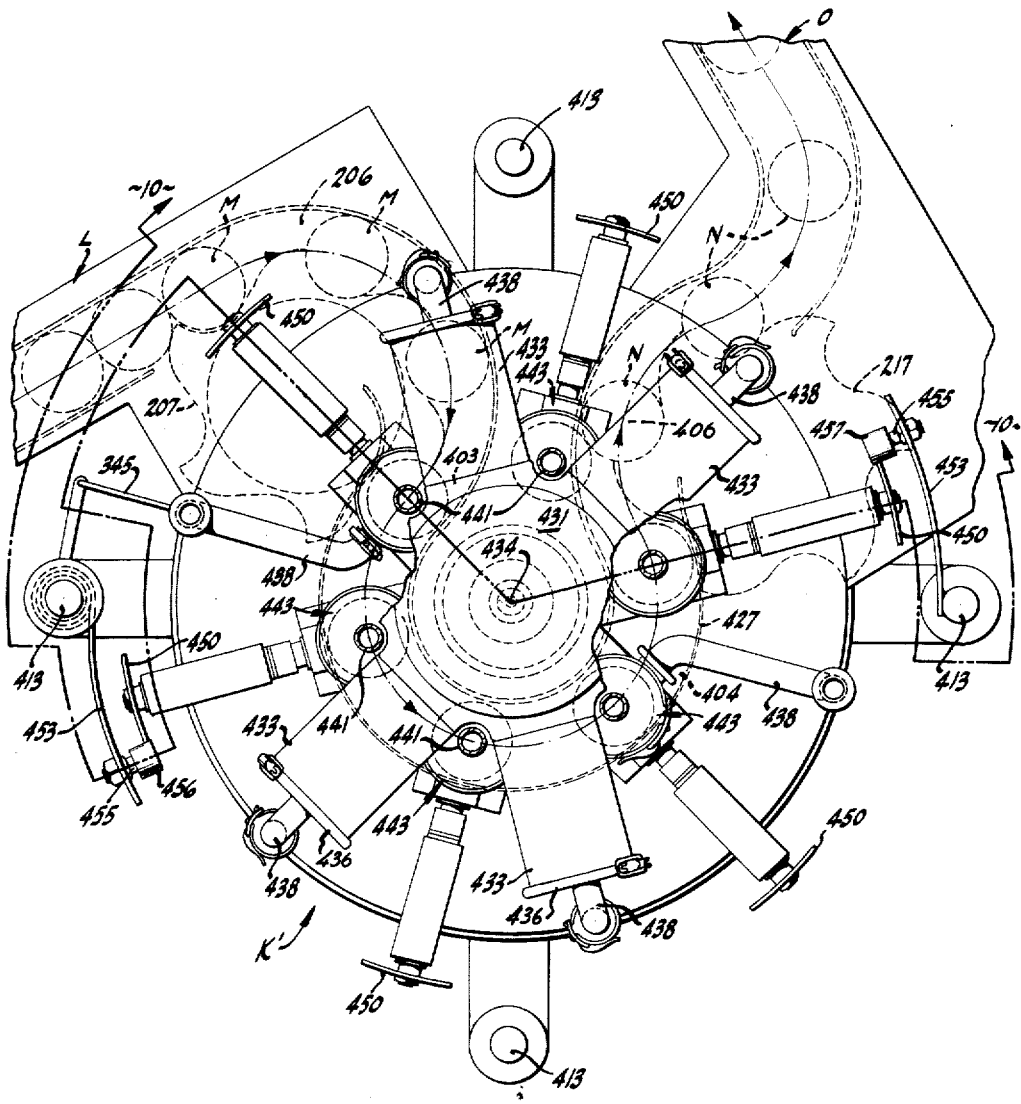
FIG-11
INVENTOR.
WILLIAM McK. MARTIN

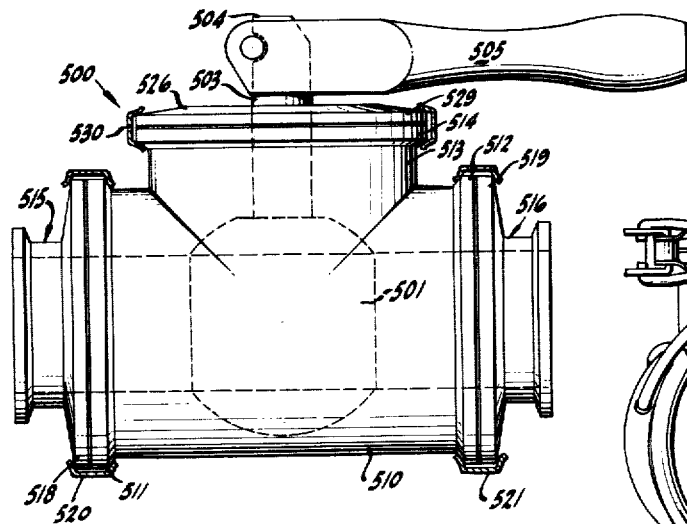
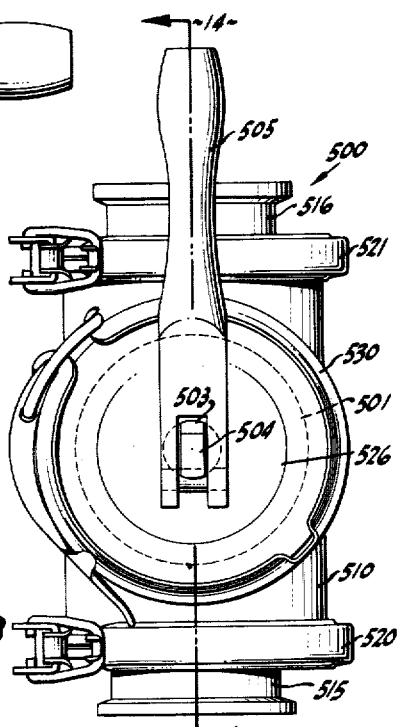
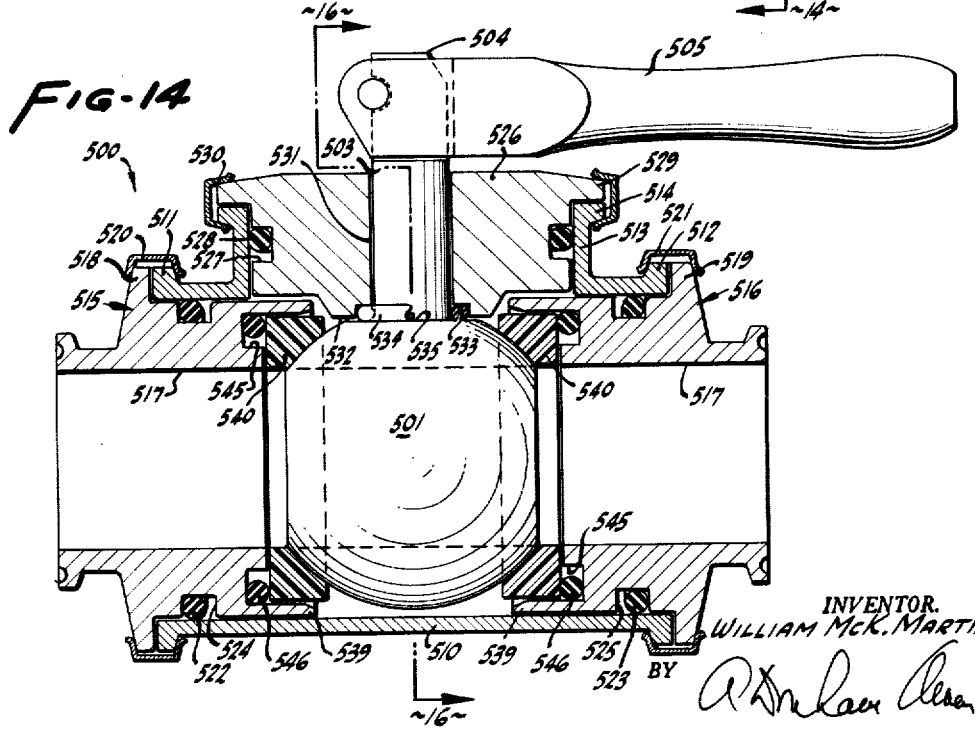

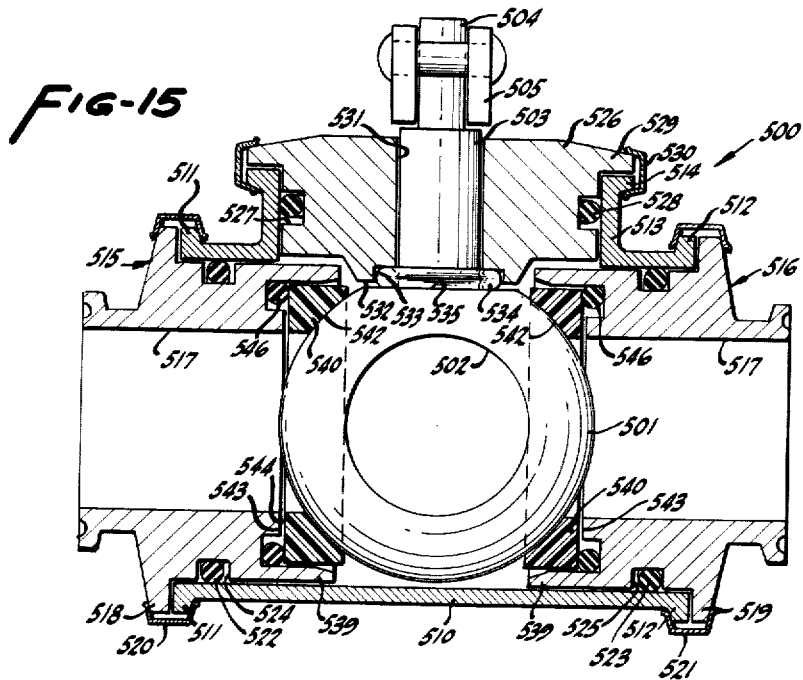
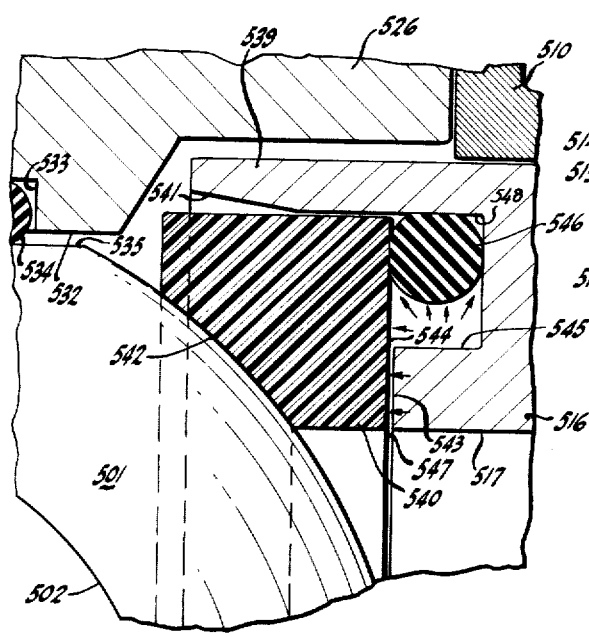
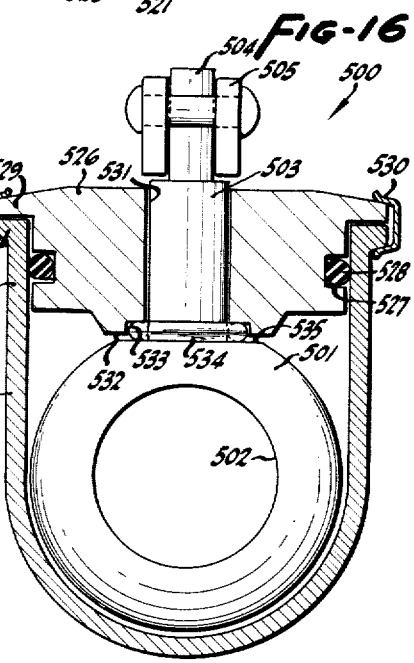
INVENTOR.
WILLIAM McK. MARTIN

INVENTOR.
WILLIAM McK. MARTIN
BY
Abraham Ome

Aug. 27, 1963 W. McK. MARTIN 3,101,752
ASEPTIC FILLING MACHINE
Filed Aug. 1, 1960 15 Sheets-Sheet 13

INVENTOR.
WILLIAM McK. MARTIN
BY

Aug. 27, 1963  W. McK. MARTIN  3,101,752
ASEPTIC FILLING MACHINE
Filed Aug. 1, 1960  15 Sheets-Sheet 14

INVENTOR.
WILLIAM McK. MARTIN
BY

United States Patent Office 3,101,752
Patented Aug. 27, 1963

3,101,752
ASEPTIC FILLING MACHINE
William McK. Martin, 457 Virginia Ave.,
San Mateo, Calif.
Filed Aug. 1, 1960, Ser. No. 46,537
12 Claims. (Cl. 141—92)

This invention relates to an improved filling machine for use both with homogeneous fluids and with particulate products. It is very useful in aseptic canning systems, especially those for canning foods containing suspended solids, such as vegetable soup, beef stew, and the like. It also relates to improvements in ball valves for use in aseptic canning systems and the like.

This application is a continuation-in-part of my application Serial Number 845,744, filed October 12, 1959, now Patent No. 3,041,185, which was a continuation-in-part of my application Serial Number 759,098, filed September 4, 1958, and now abandoned, which was a continuation-in-part of my application Serial Number 546,306, filed November 14, 1955, now abandoned.

A very important object of the present invention is to prevent disintegration, attrition, or mushing of the solid components in the food product while assuring their accurate and rapid filling into presterilized containers.

Another important object of the invention is to provide for the continuous production of canned fluid or semi-fluid food products containing solid pieces and having better flavor, color, texture, and uniformity than can be produced by conventional canning methods. The invention can also be used to produce homogeneous liquid and semiliquid canned products of improved quality.

The Necessity of Sterilizing the Product Before Putting It in the Can

High-temperature sterilization cannot be done after the product has been put in the can because of the slow rate of heat transfer from the outside to the interior of the product and because of control difficulties. The volumes and cross-sectional areas in cans are so large that when a peripheral portion is heated to 300° F., the inside center remains below the sterilization temperature long after sterilization has been completed at the peripheral portion and after prolonged heating has already begun degradation of the peripheral portion.

With viscous products in which heat transfer is by conduction and not by convection, high processing temperatures cannot be used after the product is in the can because of excessive scorching of the product in contact with the excessively hot can walls. Furthermore, even with nonviscous or low-viscosity liquid products, as well as particulate-type products such as whole kernel corn in brine and peas in brine, in which the heat transfer is largely by convection, high-temperature processes cannot be used satisfactorily after the product is in the can because of the difficulties of accurately controlling the short process times required in the high-temperature ranges. Another difficulty is that the head space or fill of the can affects the degree of agitation of the product in the can, and if the can is overfilled, the reduction in headspace is reflected in less effective heat transfer; consequently, there is danger of understerilization with a consequent hazard of spoilage of the finished canned product.

In this invention, the high-temperature sterilization step precedes the filling step, the product being spread out in a thin layer and quickly brought to the sterilization temperature. Subsequently, the sterile food is cooled and is filled and sealed in the cans at the relatively cool temperature of about 90–110° F. That means that the already-sterilized food has to be put into already-sterile cans and sealed by already-sterile covers. It also means that the sterility of the cans and food must be maintained and protected before, during, and after the filling operation.

Unsuitability of Prior-Art Fillers for Aseptically Canning Particulate Foods An important object of this invention is to provide a filling machine that can be conveniently operated under completely sterile conditions. Fillers already on the market can accomplish that object for some foods, but none of them has been suited to what I call "particulate foods," i.e., foods containing actual pieces of solid food material. For example, vegetable soup may contain whole peas and beans, diced potatoes, carrots, and pieces of celery. Beef stew would contain chunks of beef, diced potatoes and carrots, and so on. Filling machines capable of aseptically canning non-particulate liquid products have been unable to accommodate such gross pieces without chewing or pulping them into a practically homogenized slurry. Friction between the food and the edges of the machine or even friction between the food particles wears down the particles by attrition. Moreover, in some machines, the valves have been rendered inoperative or even damaged by the accumulation of such particles; in other machines the particles have been broken up, mashed, and destroyed as individual particles by the valves. Since we eat with our eyes and by feel as much as with our palate, such foods are not acceptable and nullify a basic object of aseptic canning—which is to distribute to consumers canned food substantially identical to what a good chef or cook would serve directly from his kitchen.

Accordingly, another important object of the invention is to provide a filler capable of use with particulate foods without damage to the solid components and without adversely affecting operation of the filler. However, the filler's utility is not, of course, limited to particulate foods or even to foods at all, or to sterile processes. The point is that this filler is of especial utility in those fields.

The Importance of Maintaining Back-Pressure in the Entire Processing System and Its Bearing on the Filler Sterilization and cooking at temperatures higher than 212° F. can be carried on only at high pressures. For example at 290° F. the pressure has to be maintained at not less than about 43 p.s.i.g., which corresponds to the vapor pressure of water at that temperature; otherwise the water content of the product will flash. Flashing cools the product, dropping it back to the temperature at which water vaporizes under the prevailing pressure. Flashing also tends to disintegrate the solid food particles; for example, if peas were being cooked under pressure at 290° F. and the pressure suddenly dropped, the peas would explode due to the sudden exit of steam from within the peas. Flashing also affects the flow of a continuous process by its effect upon the products in the process.

Therefore, in an aseptic canning process, it is very important to maintain back-pressure on the product stream. Ahead of the filler, the food is heated in a continuous stream to the sterilization temperature; then it is held at that temperature, while moving under pressure; next it is cooled to the desired filling temperature, while still moving and still under pressure—all this in order to maintain the back-pressure in the heating and holding portions of the system. It is therefore necessary to maintain the product under pressure until it is finally discharged from the filler. Accordingly, it is important that the filler operate at pressures not lower than this back-pressure and that the filler not cause this back-pressure to fluctuate any substantial amount. It is also important that the filler itself not be affected adversely by the pressure of the product stream and that the product not be affected adversely by the filler.

Fillers currently in use for aspectic canning of homogeneous liquids employ a metering pump just ahead of the filler in order to maintain this back pressure. However, when handling foods containing solid pieces, such as vegetable soup, such pumps give rise to three serious objections:

(1) The pump chops and disintegrates solid components and thus gives the finished product an unattractive mushed or mulligan-like appearance.

(2) Slippage of the liquid phase of the product under pressure through clearances in the pump results in straining out soild components in the pulsating or intermittent metering operation of the pump, with a consequent accumulation of the solid components in the line ahead of the pump. The solids thus accumulated in the line ahead of the pump are discharged with each cycle of the pump. If the liquid phase of the product is thin or of low viscosity, the slippage of the liquid through the pump will be so great that the speed of the pump will have to be greatly reduced in order to maintain the flow to the filler at a constant rate.

For example, in tests in which ⅜" cubes of carrots and potatoes were metered into a water solution containing no starch or other thickening agents and processed at 290° F. under a pressure of 60 p.s.i.g. at the rate of 5 gallons per minute, the speed of the back-pressure pump had to be reduced to less than one third of the speed corresponding to its actual volumetric capacity. In this test the solid components accumulated in the pipe and water-jacketed cooling tube ahead of the pump, while the water solution percolated or strained through the accumulated mass of cubed carrots and potatoes until the whole system (cooling tube, holding tube, float chamber and process chamber) became plugged with the solid material.

A subsequent test showed that with only water in the system under 60 p.s.i.g. pressure and with the back-pressure pump standing still and the drive motor turned off, the slippage of water through the pump was 6¼ gallons per minute. Obviously, it would be possible to reduce the pump's flow rate to 5 gallons of water per minute only by reducing the pressure in the system, with a corresponding reduction in temperature in the heating and heat-holding portions of the system.

(3) Metering pumps capable of handling liquid-solid mixtures without attrition of the solids cannot be used in maintaining back-pressure in the system during presterilization of the equipment, because of the slippage through the pump. Even when the pump is stainding still, slippage is such that steam pressure in the heating unit would have to be reduced below that necessary to mainain he temperature required to sterilize the system. Moreover, there would be flashing of the super-heated water in the discharge side of the pump with a resulting reduction in temperature below that necessary for sterilization of parts of the pump and the system beyond the pump through the filler.

The filler of the present invention maintains the back-pressure in the product stream at all times in its operation, without causing fluctuation during any portion of the filling cycle and, morevover, the pressure level of the product stream does not adversely affect the filler or its operation. In contrast, none of the known fillers are capable of maintaining back pressure.

Hence, another object of the invention is to provide a filler for aseptic canning processes that maintains back-pressure on the food being processed and is itself unaffected by this back-pressure. My invention accomplishes this object economically and in a simple manner, without introducing complexity and adding possible new causes of trouble.

A further object is to provide a filler that can readily be sterilized and can be maintained in a sterile condition during continuous operation at high can-filling speeds.

In addition to all these things, any filler must be capable of accuracy. Every canner has to give full weight and give it consistently, if he is to stay out of trouble with the Food and Drug Administration, but he also has to avoid giving too much if he is to endure competition. So another object of this invention is to provide consistent accuracy in a high-speed filling machine.

Further objects of the invention are to provide a filling machine of superior efficiency, simplicity of construction, and capable of high-speed operation; to provide a novel type of piston-and-cylinder filler with novel inlet and outlet valves; and to provide a novel type of cam operation of the inlet and outlet valves for the cylinder, together with a novel synchronization of the inlet and outlet valves with the piston, as well as novel means for adjusting the stroke of the piston to fill different sized containers with different amounts.

*Importance of Proper Valving*

The invention also provides a novel type of ball valve, having several different embodiments that may be used at different places in an aseptic canning system, especially in the filler. Tightness is essential in such a system, as are an ability to provide initial sterilization and an ability to maintain that sterilization.

One object of the invention is to provide a ball-type valve in which the tightness of the seal between the valve seat and the spherical surface of the valve body increases with increasing hydrostatic pressure. An O-ring in a groove is utilized like a piston in a cylinder, the hydrostatic pressure exerted on it being transmitted to the back side of the valve seat to increase the tightness of the seal against the spherical surface of the valve body. Moreover, the same hydrostatic pressure is also transmitted directly to the back surface of the valve seat. Although the actual movements of the O-ring and valve seat are negligible except at excessively high pressures, the pressure is nevertheless transmitted directly to the seal between the valve seat and the spherical metal surface of the valve body, the tightness of the seal thus increasing with increasing pressure.

Another feature of my new ball valve is that it is equally tight when operated with pressures on either side of the seals. In other words, it may be installed in any line irrespective of direction of flow or pressure.

Still another feature, a very important one, is that the valve seat is self-aligning so that with wear or warpage, the hydrostatic pressure exerted on the back side of the valve seat always produces a tight seal between the seat and spherical surface of the valve body. No metal "back-up" springs are used to keep the valve seats in tight contact with the valve bodies under zero or low pressure; the O-rings themselves are compressed sufficiently to maintain a tight seal under low pressure, and as the fluid pressure within the valve is increased, the hydrostatic pressure exerted on the back side of the valve seat still further increases the tightness of the seal.

The above principles are applied to two-way, three-way, and four-way valves. In the latter two types, the spherical valve body is positioned between two identical and opposite valve seats with back-up O-rings. A small annular clearance around the outside circumference of the valve seats provides for self-alignment of the spherical valve body between the two opposing valve seats and accommodates wear or warpage of the valve parts under changing temperatures.

Other objects and advantages of the invention will appear from the following description of a preferred embodiment, and of some modifications.

*Brief description of the drawings*

In the drawings:

FIGS. 1A and 1B comprise a two-part isometric and partly diagrammatic view of an aseptic canning apparatus employing a filler and several ball valves embodying the principles of the invention. Some parts are broken away and shown in section, to disclose other parts. FIG. 1A shows the metering and mixing apparatus and the product-sterilizing heater, while FIG. 1B shows the temperature-maintaining and cooling apparatus, the container sterilizer, the filler and the container-closing apparatus.

FIG. 2 is a view in elevation of a filler embodying the principles of the invention. Some parts have been omitted, some parts have been broken off, and some parts have been broken away and shown in section along the line 2—2 in FIG. 3 to reveal parts behind them more clearly.

FIG. 3 is a top plan view of the device of FIG. 2, partly broken away and shown in section, omitting some parts that would tend to obscure the view.

FIG. 4 is a view in horizontal section taken along the line 4—4 in FIG. 2.

FIG. 5 is a condensed developmental view in elevation corresponding to the path shown in the circle 5—5 in FIG. 3 and illustrating the filling cycle together with the valve-operating cam arrangement.

FIG. 6 is an enlarged view in elevation taken along the line 6—6 in FIG. 3 showing one of the ends of the product-filling cylinder and its valves.

FIG. 7 is a vertical sectional view on the scale of FIG. 6 taken along the line 7—7 in FIG. 3.

FIG. 11 is a top plan view, with some parts broken off and some parts shown in section, of the machine of FIG. 10.

FIG. 12 is a view in side elevation of a preferred form of two-way ball valve embodying the principles of this invention.

FIG. 13 is a top plan view of the ball valve of FIG. 12.

FIG. 14 is a view in elevation and in section taken along the line 14—14 in FIG. 13, the valve being shown in open position.

FIG. 15 is a view like FIG. 14 with the valve shown in closed position.

FIG. 16 is a view in elevation and in section taken along the line 16—16 in FIG. 14.

FIG. 17 is an enlarged fragmentary view in elevation and in section of a portion of FIG. 14.

*Brief Generalized Description*

The present invention is especially valuable in an aseptic canning system like that described and claimed in my copending application, Serial No. 845,744. That system involves: (1) precooking or blanching each of the solid food constituents with both the temperature and time of treatment automatically controlled, (2) metering each of the precooked or blanched solid constituents into the liquid phase of the product in the desired amounts and proportions, (3) mixing the solid and liquid components and feeding the mixture uniformly to a pumping stage, (4) pumping the mixture into and through a product heater, a temperature holding tube, and a cooling system, to a filler, while maintaining uniform distribution of the solid components in the mixture throughout these operations, (5) quickly heating the product mixture to temperatures in the range of 275–300° F. without local overheating or scorching of any parts of the product and without attrition or disintegration of the solid components, (6) conveying the heated product mixture through the holding tube, in which it is maintained at the elevated temperature for sufficient time to cause penetration of heat into and throughout the solid components, thereby effecting complete destruction of bacterial spores and other microorganisms contained therein, (7) cooling the product mixture to approximately room temperature or to some other temperature below what the flash point of the product would be at atmospheric pressure, and (8) filling the cooled sterile product mixture in metered or measured amounts into presterilized containers while maintaining the product mixture under pressure in all parts of the system between the pump and the filler and while maintaining the filler in sterile condition at all times during operation.

Figure 1B:
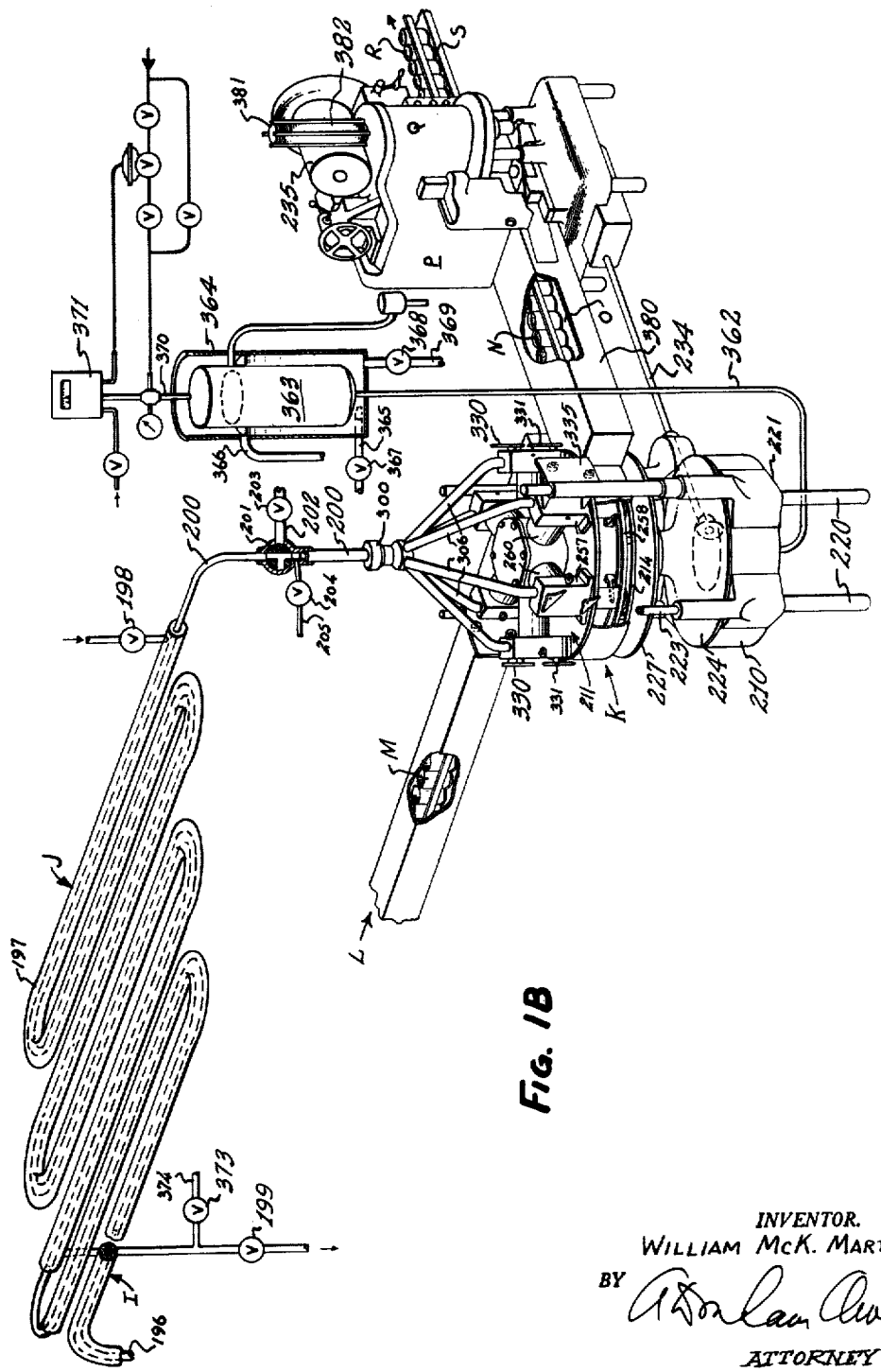

More specifically, as shown in the drawings, a liquid-supply unit A (FIG. 1A) feeds the liquid phase of a product to be canned to a liquid-metering unit B. Meanwhile, a solids supply, metering, and blanching unit C feeds various measured amounts of particulate or solid components into a mixing device D, where the solids are added to and mixed with the liquid. From there, the mixture is forced by a pump E through the remainder of the system, going first to a product-heating unit F and then into a flow-control device G. The flow-control device G regulates a variable speed device H which in turn controls the speed of the pump E and the metering rate of the solids-feeding unit C.

From the flow-control device G the hot mixture passes through a high-temperature-maintaining device I (FIG. 1B), where sterilization is completed, and then flows through a cooling means J. The cool sterilized product then flows to a filler K. A container sterilizer L supplies empty sterile containers M to the filler K, and filled containers N pass from the filler K through a sterile conveyor O to a closing machine P. A cover sterilizer Q supplies sterile covers to the closing machine P, which applies them to and seals them on the containers N. The sealed, filled containers R then leave the sterile closing machine P, and a conveyor S takes them outside the sterile atmosphere of the aseptic canner to non-sterile equipment such as the washer, labler, case packer, and other equipment not directly concerned with the aseptic canning system.

The Liquid Supply Unit A (FIG. 1A)

The liquid supply unit A may comprise a kettle 30 which contains a liquid food component 31. The kettle 30 may be steam-jacketed and may, if desired, preheat or even precook the liquid 31 to any desired temperature, usually below 212° F. An outlet 32 at the lower end of the kettle 30 may lead through a vertical pipe 33 and a three-way valve 34 to a pipe 35. The three-way valve 34 is used during the presterilization of the aseptic canning system, at which time the valve 34 closes off the pipe 33 from the pipe 35 and connects the pipe 35 to a water pipe 36. The purpose and operation of this feature and a preferred valve structure (FIGS. 21 and 22) will be explained later.

The Liquid-Metering Unit B (FIG. 1A)

The pipe 35 leads via a butterfly valve 54 into the liquid metering unit B, which includes a generally cylindrical housing 40 providing a float chamber 41 in which is mounted a float 42. A generally horizontal conduit 45, lower than the desired level of the liquid 31 in the chamber 41, leads to the mixing device D, where the liquid level is, of course, substantially the same. Further description of a preferred form of unit B will be found in the parent application Serial Number 845,744.

Solids Supply, Metering and Blanching Unit C (FIG. 1A)

As shown in the drawings, the metering and blanching unit C includes a series of hoppers 60, one for each solid ingredient, a metering and blanching device 61 at the lower end of each hopper 60, and a single conveyer belt 62 on which all the metering devices 61 mete out their ingredients and which carries them to and dumps them into the mixing device D. The solid constituents to be measured out may be such things as cubed or sliced vegetables (e.g., potatoes, celery, carrots, onions), whole vegetables (e.g., beans, peas and small onions), and small vegetables (e.g., cubed beef or slices of ham); the cubes may be about ⅜" or ½" on a side, or whatever size one wishes them, the cutting being done in any desired manner. If desired, any of these ingredients may be precooked or sauted. Further description of the unit C is given in application Serial Number 845,744.

The Mixing Device D (FIG. 1A)

The mixing device D comprises a funnel or housing 90 having a side inlet connected to the conduit 45, an open upper end, and a bottom outlet, which preferably is also the inlet to the input pump E. Solid material falls from the belt 62 directly or down a chute 94 which ends below the open top of the funnel 90, and liquid enters the funnel 90 through the conduit 45. The liquid flow rate and its level are determined by the float 42, while the solid components falling from the belt 62 are metered by the unit C. The device D contains a screw 97 that mixes the solid components with the liquid 31 as the liquid flows continuously into the input pump E. Also, the lower end of the screw 97 is so made that it prevents the solid components from accumulating and bridging over the funnel outlet and pump inlet, further description being given in application Serial Number 845,744.

The Input Pump (FIG 1A)

The input pump E is a suitable type of positive-displacement pump driven by a variable-speed device H. It should be capable of pumping liquid products at pressures up to about 80 to 100 pounds per square inch and capable of operation without chopping or mechanically disintegrating the relatively soft food solids. It is a valveless pump, for valves tend to crush, cut, or chop the product. A typical such pump has a pair of twin-lobed impellers, but single-lobe impellers are also satisfactory. Such pumps are made by Waukesha Foundry Company and by Creamery Package Company. Alternatively, a Robbins and Myers Moyno pump may be used. The pump E feeds the mixture into the pipe 105 and forces it through the system to the point where the filler K dispenses the mixture into the containers M. There are no valves or other obstructions between the pump E and the filler K, though there is the flow-control device G beyond the heater F.

The Product Sterilizer-Heater F (FIG. 1A)

The preferred heater F includes an insulated housing 110 having a cylindrical upper portion 111 with a closed upper end 112, a central cylindrical portion 113, and a conical funnel-like lower portion 114. The lower portion 114 has a stationary outlet tube 115 and a rotating inlet tube 117 that communicates with the inlet pipe 105. A motor 120 rotates the inlet tube 117 at a desired speed, preferably around 40 to 60 r.p.m. Most of the inlet tube 117 lies generally parallel to the conical wall 114; at its upper end an outlet spout 122, which always faces the adjacent central cylindrical housing wall 113 closely adjacent the upper end of the lower portion 114, pours the product gently down the sloping wall 114 and distributes it around the housing 110 in a thin film. The slow speed of rotation of the spout 122 does not project the product by centrifugal force against the walls. The gently flowing product is then heated by surface contact only, with a swirling mass of superheated steam or other hot gas.

Between a pair of annular partitions 123 and 124 in the housing upper portion 111 is an inlet opening 128 for superheated steam. A cooling channel 129 is provided for circulating water to keep the adjacent housing wall cool so that spattered soup or other food product being heated will not be burned onto the housing surface. The partitions 123 and 124 divide the housing 110 into three main chambers, an upper chamber 130, an intermediate chamber 131 where the steam is introduced, and a lower chamber 132 into which the food product is introduced by the revolving spout 122. The upper end wall 112 of the housing supports a vertical drive shaft which drives a fan 135 at its lower end, the drive shaft projecting out of the housing 110 and being provided with suitable driving means, such as a high-speed motor. The fan 135 includes a plurality of inner blades 141, tilted so that, when they rotate, they move steam from below them to above them. At the outer periphery of the fan 135 is a series of impeller blades 145.

The intermediate chamber 131 serves as a steam entrance and distributing chamber. The impeller blades 145 rotating at high speed (e.g., at about 1800 r.p.m. in a housing 110 about 3' in diameter) pull the steam out from the chamber 131 and impel it in a whirling motion inside the lower chamber 132 and out toward the walls 113 and 114. The hot steam (e.g., at 800–1200° F.) whirled out by the blades 145 comes against the descending food product that is flowing gently down the walls 113 and 114 of the lower housing, this gentle flow constantly exposing new surfaces of the product. The whirling steam does not enter the food product but does heat its surface. Then the cooled steam (e.g., at 350–450° F.) is sucked up by the fan's inner blades 141 and pulled through the interior of a cylindrical partition 126 into the upper chamber 130.

The upper chamber 130 is provided with a suitable steam exhaust outlet 148 from which a duct 149 conducts most of the steam to a gas-fired superheater 150 for recirculation. The steam thus reheated is returned through a duct 153 to the opening 128 in the annular chamber 131, from which it is again impelled tangentially into the product-heating chamber 132. Further explanation of the heater F will be found in application Serial Number 845,744.

The Control Device G (FIG. 1A)

From the heater F, the food flows through heat-insulated equipment until it reaches the cooling tubes J. The insulation 177 is not in all instances shown in the drawings, for the sake of simplicity. The conduit 115 leads from the heating chamber 132 to the control device G, which may comprise a float chamber 181, a depending shaft 182 driven by the motor 120 and a slidably mounted float 183. At the lower end of the shaft 182 is a hollow screw 184 like the screw 97 for assuring the transmission of the mixture of materials, its tip preventing bridging of the outlet and preventing crushing, mangling, or injuring the solid particles. A tube 147 equalizes the pressure in the chamber 181 with that in the heater F.

The float 183 is mounted slidably on the shaft 182 but has no other relation to it except that the shaft 182 serves as a guide maintaining the float 183 in proper diametrical alignment. A lever system attached to the float 183 operates a needle valve 187, which throttles a constant stream of air under pressure (e.g., 20 p.s.i.g.) from a pneumatic tube 190. This airstream passes through a conduit 194 and serves as a control for the variable-speed device H which drives the pump E, as explained in application Serial Number 845,744. As the liquid level in the float chamber 181 rises, the speed of the device H for the pump E and metering-blanching unit C is reduced. Then, the float 42 acts on the butterfly valve 54 to control the liquid level in the units B and D, so that the liquid is also metered to give the correct proportion of liquid to solids. Thus the different parts of the system act on each other. In this connection, it should be pointed out that the cause of liquid rising in the chamber 181 and raising the float 183 is either that the pump E is feeding material too fast, or that the filler K is dispensing material slower than its normal constant rate. Normally, the level of the liquid in the float chamber 181 is constant.

*The Temperature-Maintaining Device I (FIGS. 1A and 1B)*

The fluid passes from the device G into the temperature-maintaining device I by which it is held at the desired temperature for a time sufficient to complete sterilization, which may be from a few seconds up to about a minute. The larger the solid particles, the longer the time necessary to assure complete penetration of the particles by the heat at the holding temperature. For liquids like homogeneous pea soup 8 to 10 seconds at 286° F. is sufficient. For vegetable soup containing ⅜" cubed vegetables, a holding time of 38 seconds at 290° F. has been found sufficient for complete sterilization.

The device I may comprise an insulated tube 196 of diameter great enough to prevent damage to solid pieces in the moving product and long enough to give the desired holding time while the product is continuously moved through the tube 196 by the pressure imparted in the heating chamber 132, at a velocity sufficient to maintain the proportions of the mixture without damage to the solid particles. Here, sterilization is finished.

*The Cooling Device J (FIG. 1B)*

Next, the liquid passes into the cooling tube J, which is provided with a water jacket 197 having an inlet valve 198 and an outlet valve 199 which enable the cooling tube to be drained during initial sterilization. From there the mixture passes through a pipe 200 to the filler K. Just before the liquid reaches the filler K, there is a valve 201 to which is attached a drain conduit 202 with a back-pressure valve 203. Just beyond the valve 201 is a second valve 204 which may be used to admit steam from a conduit 205 during the presterilizing of the system.

*Container Sterilization (FIG. 1B)*

In the meantime, containers M have been sterilized by a suitable sterilizer L, such as is well known in the art. The containers M are then ready to be fed into the filler K through a sterile passageway 206 by a star wheel 207.

*Brief General Description of the Filler K (FIGS. 1B and 2–4)*

In general the filler K shown in the drawings comprises a stationary main frame 210 and a rotating assembly 211 supported by the frame 210 and cooperating therewith to define a chamber 212 inside which sterile conditions are maintained, as by introducing a steady stream of steam from the container sterilizer L and the passage 206. Presterilized empty cans M or other suitable containers enter from the container sterilizer L via the enclosed sterile passage 206 and the star wheel 207. The star wheel 207 introduces each empty can M into the chamber 212 through an inlet opening 213, and the can M is carried around a stationary track 214 (supported by the frame 210) while at all times being kept in alignment with a dispensing outlet 215 (FIG. 2). The can M travels approximately 270° along the track 214 and is then taken out as a filled can N at an outlet 216 by a star wheel 217 (or by fingers of a feed chain) and sent by the conveyer O to the closing machine P, both of which are also maintained in a sterile atmosphere.

*The Filler Frame 210 (FIG. 2 Mainly)*

The stationary frame 210 may include suitable standards 220 to hold the filler K above the floor level. The standards 220 support a base 221, which supports the remainder of the frame 210, including a central vertical stationary pipe 222 and a series of upright rods 223 spaced around the periphery of the filler K. The base 221 also supports an annular gear housing member 224 with an upwardly extending bearing boss 225. Secured rigidly to the exterior of the boss 225 is a spider 226 that supports an annular rim 227 with a cam track 228, discussed later. The rim 227 also supports the can track 214 on a series of standards 229.

*Rotation of the Housing Assembly 211 and the Star Wheels 207 and 217 (FIGS. 2–4)*

The rotating assembly or turret 211 includes an upper hub 230 secured to a rotating vertically mounted hollow shaft 231 that is mounted rotatably around the pipe 222. Suitable bearings and fluid seals may be provided along the shaft 231, and the shaft 231 is provided near its lower end with a bevel gear 232, preferably enclosed between the gear housing 224 and the base 221. The gear 232 may be driven by a bevel gear 233 on a drive shaft 234 that lies at right angles to the shaft 231 and is driven by a suitable motor 235, which is the same motor that drives the closing machine P. Thus, rotation of the drive shaft 234 causes rotation of the assembly 211. The drive shaft 234 may also drive the star wheel 207 through gears 236 and 237 and star-wheel shaft 238. Similarly, the star wheel 217 may also be driven from the shaft 234.

The hub 230 has a lower sleeve portion 240 pinned to the shaft 231 and has an upper flange 241. Around the sleeve portion 240 is secured a ring 242 that supports a spider 243. At the outer end of the spider 243 is an annular rim 244 provided with openings 245 in which are seated bushings 246. Inside the bushings 246 short shafts 247 are rotatably mounted, to the upper ends of which are secured container-engaging fingers 250 that engage the containers M and move them around the track 214, each centered beneath a filler outlet spout 215. To the lower end of each shaft 247 is secured a crank arm 251 by which a cam roller 252 is rotatably supported.

The cam rollers 252 engage the cam 228, which is generally circular but has a flattened portion 253 near the filler track outlet 216. The purpose of this portion 253 is to slow the filled cans N down slightly as they approach and move into the outlet 216, to make transfer at this point gentle. At all other points, the fingers 250 are urged firmly against the cans and move them at constant speed. The fingers 250 pick up the cans M from the star wheel 206 and propel them through the filler K between a stationary guide rail 258 and a moving guide ring 259, while maintaining the cans always in alignment with the outlet spouts 215. The cam 228 causes the fingers 250 to yield and relax only after the outlets 215 are closed and as the full cans N approach the filler track outlet 216.

The hub flange 241 supports the filler outlet spouts 215, so that their synchronization with the fingers 250 is assured. It also supports a cup-shaped upper housing 254 that is closed by a sealed cover 255, enclosing a sealed chamber 256. The housing 254 and a block 257 on the flange 241 support each of a set of filling cylinders 260.

*The Filling Cylinders 260 and Their Pistons 270 (FIGS. 2 and 3)*

The radially mounted cylinders 260, in any suitable number, lie horizontally and symmetrically around a center 261 of the housing 254, about which the assembly 211 rotates. The radially inner end 262 of each cylinder 260 opens into the chamber 256, in which sterile fluid is normally retained during operation. The radially outer end 263 of each cylinder 260 is closed by the block 257 except for an inlet opening 264 and an outlet opening 265, preferably at the top thereof. The inlet opening 264, which is lower than the outlet opening 265, communicates with an inlet conduit 266 in the block 257 that leads down from above into the inlet 264, while an outlet conduit 267 in the block 257 leads down from the outlet 265 toward the outlet 215.

A piston 270 reciprocates in each cylinder 260. Preferably, the cylinder 260 and piston 270 are both made of high quality stainless steel honed to enable the use of close tolerances and to prevent undue wear. An O-ring 271 near the outer end of the piston 270 is preferably used to prevent leakage between the piston 270 and the cylinder 260.

At the opposite end of the piston 270 a wear ring or antifriction ring 272, preferably of Teflon, is provided to prevent scoring or abrasion of the walls of the cylinder 260 and piston 270, which would result if the two metal surfaces moved in contact with each other. This feature is important, for it has been found through extensive experimentation and thorough-going tests that stainless steel or even highly polished chromium-plated surfaces cannot be moved in close contact with each other and in contact with food products without becoming excessively scored and abraded and thereby involving an impracticably high maintenance expense. By this invention the pistons 270 are actually carried on the O-ring 271 at one end and on the Teflon wear band or strip 272 at the other end. A typical Teflon wear band 272 may be 1/16" thick and 3/8" wide and be inserted in a groove 273, 3/64" deep, located around the skirt end of the piston 270 about 1/8" from its end.

The Teflon band 272 is preferably not in the form of an endless circle, but instead is a strip cut from 1/16" thick Teflon sheet stock 3/8" wide and of a length just short of the circumference of the piston 270. The ends of the Teflon band 272 need not be joined closely enough to form a seal—in fact it is better not to have the area between the O-ring 271 and the Teflon band 272 sealed tightly because of the excess pressure which might be exerted on the O-ring 271.

The radially outer end 274 of the piston 270 is preferably concave to prevent it from mashing solid ingredients. It faces the outer end wall 263 of the cylinder 260 and is moved away from it to measure a charge of food product 104 in the cylinder 260 and then is moved toward it to dispense the charge. For this purpose, each piston 270 is attached to a rod 275 by a pin 276 to provide a freely rotatable connection, and all the rods 275 of all the pistons 270 are rotatably connected to respective crank pins 277 in a crank ring 280.

Figure 9:
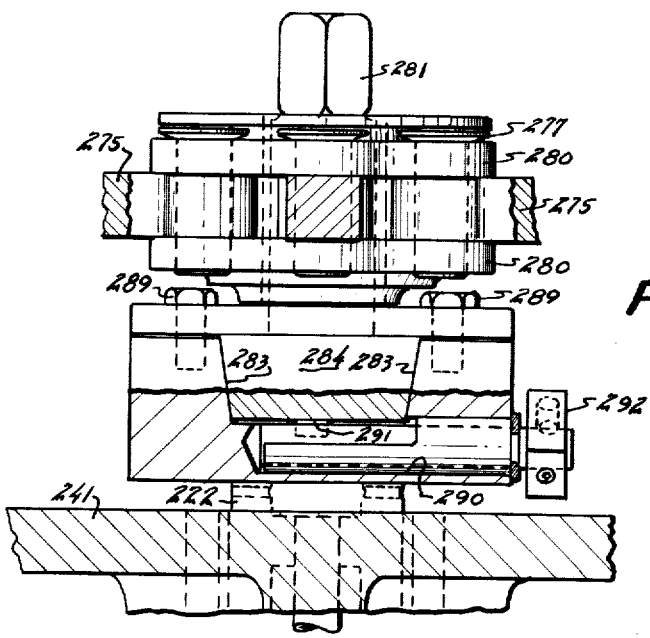
FIG. 9 is an enlarged vertical sectional view taken along the line 9—9 in FIG. 2.

The crank ring 280 is journaled on a stationary crankshaft 281 which is supported in a position eccentric to the center 261 of the rotating structure 211. The strokes of the pistons 270 are identical and are equal to twice the eccentricity of the crankshaft 281. This eccentricity can be adjusted to vary the length of the stroke. For this purpose, the crankshaft 281 is supported in the following manner (see FIG. 9): at the top of the stationary shaft 222 is mounted a stationary block 282 formed to provide a guide groove 283 in and along which a block 284 can slide. The crankshaft 281 is bolted to the movable block 284. The bottom of the block 284 is provided with a rack 285 that engages a pinion 286 journaled into the stationary block 282 and operated by applying a wrench to the keyed end 287 of a shaft. The block 284 is normally held in a fixed position by a cover plate 288 that is held to the stationary block 282 by bolts 289 and is provided with a slot 290, enabling movement of the crankshaft 281 and block 284 relative to the block 282 and cover plate 288.

With the cover 255 taken off, the bolts 289 can be loosened, and a wrench can be applied to the keyed shaft 287 to move the pinion 286 and therefore the rack 285 and block 284, carrying the crankshaft with it. The block 284 may tend to stick in the groove 283; so a cam 291 may be provided in a groove 292 in the block 282. The cam 291 may be operated by a handle or by a wrench operating on its keyed shaft 293. By thus changing the eccentricity of the stationary crankshaft 281, the filling capacity of the cylinders 260 is changed, because this lengthens or shortens the stroke of the pistons 270 by an amount equal to twice the motion of the block 284.

*The Product Tube 200 And Manifold 300 (FIG. 2)*

The food product to be dispensed from the filler K comes via the tube 200 to a manifold 300, which may be rotatably mounted on the end of the tube 200 by means of an antifriction bearing 301, leakage being prevented by an O-ring seal 302. The upper end of the manifold 300 may be a fairly simple sleeve-like fitting 303 surrounding the lower end of the tube 200, while a lower end member 304 of the manifold 300 provides a series of outlet openings 305 that each connect with a filler tube 306, each one of which leads to one of the filler cylinders 260. There are, therefore, exactly as many tubes 306 from the manifold 300 as there are cylinders 260. It may be mentioned that all the connections of the various pipes and fittings are preferably made by using clamps 307 of a well-known type which is easy to sterilize and which, once sterilized interiorly, maintains its sterilization.

Figure 8:
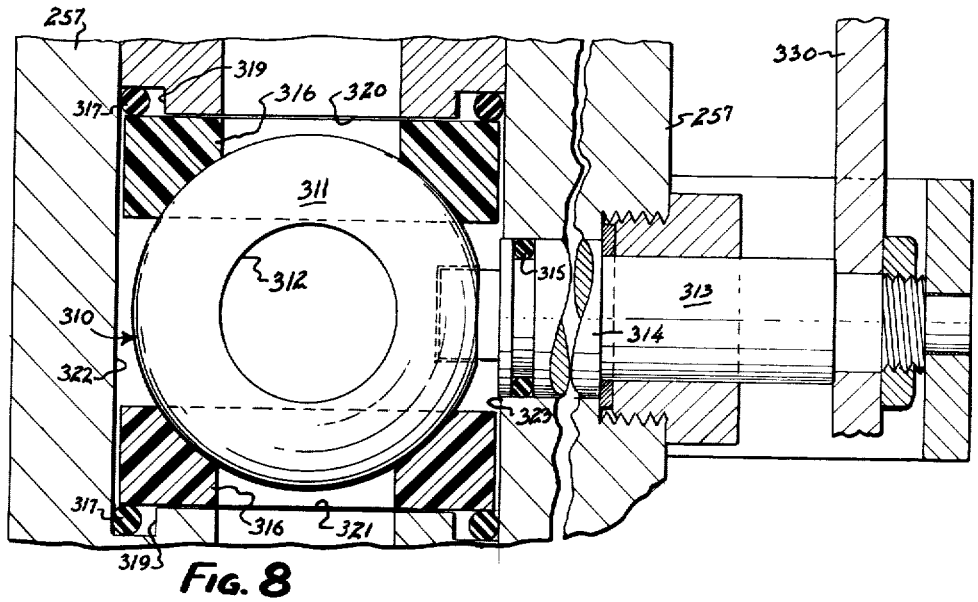
FIG. 8 is an enlarged view in section taken along the line 8—8 in FIG. 7.

*The Inlet Valves 310 (FIGS. 6–8)*

Each tube 306 is connected by an elbow 308 to an inlet fitting 309 of an inlet valve 310. The inlet valve 310 is housed in the block 257 and comprises a ball 311 having a through-passage 312 and a control stem 313, which is rotated to turn the ball 311 ninety degrees between an open position and a closed position. The stem 313 extends through a bushing 314, which is provided with one or more O-rings 315 whose sealing action insures the maintenance of sterility inside the valve 310.

The ball 311 is preferably supported between two horizontal valve seats 316, preferably of Teflon, against which a synthetic rubber O-ring 317 bears. The O-ring 317 is thicker than the depth of a groove 319 that carries it, but is thinner than the length of the groove 319. The O-rings 317 serve the twofold purpose of (1) forming a seal between the valve seats 316 and the metal members 320, 321, 322, and 323, and (2) exerting pressure on the valve seats 316 so that the spherically concave seat of the valve seats 316 will be sealed against the convex surface of the polished metal ball 311. Between the metal members 320 and 321 and the Teflon valve seats 316, clearance is provided. Clearance is also provided between the valve seats 316 and side walls 322 and 323 at each side of the valve seats 316. Therefore, the valve seats and O-rings can slide relative to the metal members 320 and 321 in between the walls 322 and 323 to provide self-alignment of the valve seats 316 with respect to the ball 311. The ball 311 is thus "floating" between the two valve seats 316, which in turn are slidably positioned between two parallel polished metal retaining surfaces; it is not rigidly supported by the actuating stems 313 or any other element. Other features of the valve 310 wil be brought out later in discussing the valve 500 of FIGS. 12–17.

A passage 318 leads from the outlet side of the ball passage 312 to the cylinder inlet conduit 266. Thus, when the valve 310 is open, the food product 104, which may have a liquid phase carrying solid particles, flows freely from the tube 200 through the manifold 300 and tubes 306, the valve 310 and passage 266, into the cylinder 260. There is no place along the path from the tube 200 into the cylinder 260 where the solid particles would be subjected to undue friction or attrition tending to break them down. There is no place at the valve 310 where they can catch, and no way in which they can affect the operation of the valve 310.

*The Outlet Valve 325 (FIGS. 6–8)*

The outlet valve 325 is substantially identical in construction to the valve 310. It is connected by the conduit 267 to the cylinder outlet 265 and by a dispensing passage 326 to the dispensing or outlet opening 215. It has the same type of internal structure as the inlet valve 310 and is rotated by a stem 327 between an open position and a closed position.

*Operating and Synchronizing Structure for the Valves 310 and 325 (FIGS. 3 to 5)*

The valves 310 and 325 are opened and closed by the same type of structure. Each inlet valve stem 313 has a generally triangular cam 330 mounted on its outer end, and each outlet valve stem 327 has a similar cam 331. Each cam or valve trip lever 330, 331 has sloping or curved cam faces 332 and 333. On a pair of the standards 223 that project up from the base 221 of the main frame 210, are mounted brackets 335 which are adjustable both vertically and rotatably by means of set screws 336. Each bracket 335 supports two shafts 337 on each of which is mounted one of four cam-engaging rollers 340, 341, 342, and 343.

The roller 340 is mounted just beyond the empty can inlet 213 to engage the upper cam surface 332 of the inlet valve cam 330 to cause it to rotate the stem 313, thereby moving the inlet valve 310 from an open position to a closed position as the cam 330 passes by the roller 340. Similarly, the roller 341 is mounted near the filled can outlet 216 at a lower altitude than the roller 340 to engage the lower cam face 333 of the inlet valve cam 330 and move the inlet valve 310 from its closed position to its open position.

The roller 342 is like the roller 340 and is mounted just beyond the roller 340 to engage the upper cam surface 332 of the cam 331 to move the outlet valve 325 from its closed position to its open position just after the inlet valve 301 is closed. The roller 343 is, like the roller 341, mounted to engage the lower surface 333 of the outlet valve cam 331 to move the outlet valve 325 from its open position to its closed position just before the inlet valve 310 is opened.

Since the shafts 337 for the cam rollers 341 and 343 are stationary during operation of the device, they are adjusted to a proper position for maintaining synchronization with respect to the stationary crankshaft 281 and this synchronization, once obtained, remains unchanged regardless of the distance from the crankshaft 281 to the center 261. The initial adjustment is readily attained by means of the bracket 335.

The bracket 335 for the rollers 340 and 342 is mounted rigidly on a sleeve 344 that is rotatable on the standard 223, so that both the trip rollers 340 and 342 may be swung outwardly to an inoperative position by a no-can no-fill lever 345 that is also rigidly secured to the sleeve 344. The lever 345 is pivotatally joined to a link 346, which in turn is pivotally joined to an arcuate arm 347. The arm 347 is positioned just below the guide rail 258 and normally parallel to it and is mounted on a pivot 348. A spring 349 urges the arm 347 toward a position in beyond the guide rail 258. As empty cans M are moved onto the track 214 by the star wheel 207 and are carried around on the track 214 by the finger 250, the lower wall of the cans bears against the arm 347 and swings the lever 345 outwardly to move the bracket 335 inwardly toward the valve trip levers 330 and 331. However, if there is no can beneath an outlet 215, the spring 349 swings the rollers 340 and 341 out of the way where they cannot engage the valve trip levers 330 and 331. Thus no product is dispensed from the cylinder 260 unless there is a can beneath the outlet 215, and the movement of the piston 260 merely backs the product temporarily up the pipe 306 and to another cylinder, so that no harm is done. Since the inlet valve 310 is kept open, the incompressible fluid cannot break the cylinder 260 or associated parts. If no cans move into the filler K for a while, the float 183 in the control device G regulates the pump E and metering devices B and C in the manner already described.

*The Filling Cycle (FIGS. 3–5)*

The filling cycle can best be understood with reference to FIGS. 3 to 5. Starting at the left of FIG. 5, it will be seen that the outlet valve 325 has just been closed, and the can N has just been filled. The cam roller 343, which closed the outlet valve 325, is so located that it engages the cam 331 and closes the outlet valve 325 at the very moment when the piston 270 reaches the outer limit of its stroke. It will be evident that this time is unaffected by the adjustment of the crankshaft 281 toward or away from the center 261. Also, since the cylinder outlet opening 265 is near the top of the cylinder 260, all the material dispensed through the outlet valve 325 is driven there by the piston 270 instead of being able to run out freely, as it would if the cylinder outlet opening 265 were located at the bottom of the cylinder 260. Moreover, by having the outlet opening 265 at the top of the cylinder 260, any air or occluded gas in the product 104 is expelled. If, on the other hand, the outlet 265 were at the bottom, accumulated air or gas would not be expelled, but, being under pressure in the cylinder 260, would expand when the outlet valve 325 is opened, and the product 104 would spurt out and splash out of the can. Also, such accumulated air or gas would affect the accuracy of the fill.

As soon as the roller 343 has caused the cam 331 to close the outlet valve 325, the roller 342 causes the cam 330 to open the inlet valve 310 and permit the flow of food product 104 under pressure into the cylinder 260. At this time the piston 270 has begun to move radially inwardly, and it continues its radially inward stroke until it reaches the inner limit of that stroke, thereby measuring the charge of food. At the very instant when the piston 270 reaches the inner limit of its stroke (crank on dead center), the inlet valve 310 is closed by its cam 330 engaging the roller 340, assuming that an empty can M is below the outlet 215, and a charge of food is therefore accurately measured. During this intake cycle, the piston 270 has been moved only by the action of crankshaft 281 on its rod 275, so that the pressure of the liquid flowing into the cylinder 260 does not affect the piston 270, and similarly, the movement of the piston does not affect the back pressure of the product 104 in the tube 200. Closure of the valve 310 also does not affect the back pressure of the product 104 in the tube 200; so it will be seen how this object of the invention has been achieved, namely, of providing a filling valve that will maintain the back pressure of the food product.

As soon as the inlet valve 310 is closed, the roller 342, by its engagement of the cam 331, causes the outlet valve 325 to open, and the material inside the cylinder 260 is dispensed into the container M by the piston 270. It will be noted that an empty can M entered the inlet cycle at the inlet 213 before the inlet valve 310 was closed, so that it was already in position to receive the contents of the cylinder 260. Moreover, it will be noted that the filled can N exists after the valve 325 is closed, giving a sufficient time for any dripping that may occur, although normally with the ball valves 311 of this invention having the self-aligning Teflon gaskets 316 and the rubber O-rings 317, there is no dripping. The O-rings 317 seal between the Teflon gaskets 316 and metal surfaces 320 and 321 while at the same time exerting the necessary pressure to prevent leakage between the ball valve 311 and the Teflon gaskets 316. Moreover, the outlet valve 325 is intentionally positioned as close as possible to the bottom of the valve block 257, so that the distance from the valve 325 itself to the discharge lip 215 is short and surface drainage is minimized.

*Maintaining the Sterility of the Annular Can-Filling Chamber 212 (FIG. 2)*

During their filling, the cans M are maintained in a sterile atmosphere inside the chamber 212 which is defined by the stationary can track 214, a vertical annular wall 350 secured to the can track 214, the rotating flange 241, and a vertical annular wall 351 depending from and secured to the flange 241. The wall 351 is also secured to a flange 352 that is secured to the rim 244. A series of short slots 353 is provided in the wall 351 to permit swinging movement of the fingers 250. Narrow clearances are provided for limited outflow of steam rather than trying to provide rotary seals. Thus, there is a small leakage of sterile gas or steam at the slots 353, more at a clearance 354 between the flange 352 and the can track 214, and at a clearance 355 between the wall 350 and a groove 356 in the flange 341. These clearances help to maintain the filling operation at atmospheric pressure when the steam or other sterile gas is introduced to the chamber 212 from the star wheel chamber 207, and the outward flow of steam prevents entry of airborne bacteria into the sterile chamber 212.

*Sterility of the Chamber 256 During Operation (FIG. 2)*

A sterile fluid such as cool water that has been sterilized or saturated steam is maintained under low pressure in the chamber 256 during operation of the device, and since the food product 104 itself is sterile, this means that at all times the cylinder 260 is in contact only with sterile fluids which are on both sides of the piston 270. The O-ring 271 in the piston 270 prevents dilution of either fluid. Sterile water is preferable to saturated steam when it is desired to fill with the product 104 at 90–110° F., since it will not heat the product. For filling at, say 190° F., steam would be preferred, since it would not cool the product.

*Equipment for Sterilizing the Chamber 256 of the Filler K (FIG. 2)*

Inside the pipe 222, a stationary tube 360 goes all the way to the top, where it is threaded to a fitting 361. This pipe 360 serves to supply the chamber 256 and the radially inner end of the cylinders 260 with sterilizing steam at first and, later, sterile water. The pipe 360 is connected by a pipe 362 to a reservoir 363, normally containing sterile water, and having a jacket 364 normally containing cold water, circulated by pipes 365 and 366. An inlet closure valve 367, a drain valve 368 and a drain conduit 369 are also provided. The upper end of the reservoir 363 is connected by a conduit 370 to a suitable source of steam, with controls 371 to maintain the proper temperature and pressure. A bleed valve 372 leads from the bottom of the chamber 256 to free it from condensate during presterilization.

*What Happens After the Cans Are Filled (FIG. 1B)*

The filled cans N are handled in closed sterilized chambers until they have been sealed. They pass along a conveyor O in a sterilized chamber 380 into the closing machine P. Meanwhile, covers 381 are placed in a suitable storage unit 382 and introduced into a cover sterilizer Q of any desired type. From there the sterile covers 381 pass to the closing machine P. The closing machine P operates in the normal manner of aseptic closing machines to seal the cover 381 tightly on the can N. Since no cooking is to be done later, everything is sterile at this point. All interior surfaces of the closing machine P which may in any way come into contact with either the filled sterile cans N or sterile covers 381 are maintained in a sterile condition by the outward flow of sterile gas or steam. The closing machine P is then provided with an outlet through which steam exits to maintain sterility and through which the sealed cans R pass outside the aseptic canning unit along a conveyer S, whence the cans R go to a washer, labeler, and case packer.

*Operation of the Device of FIGS. 1 to 9*

*Step 1: Presterilization of the system.*—Before running a food product through the aseptic canning system, that system is first treated so that the pertinent parts thereof are in a sterile condition. In doing this, no solids are added; i.e., the belt 62 is not operated. The valve 34 is closed to the pipe 33, and tap water is introduced into the system through the pipes 36 and 35, the float chamber 41, the conduit 45, the funnel 90, and the pump E, which sends it into the product heater F through the conduit 105 and the inlet tube 117. With the steam superheater 150 operating, superheated steam, e.g., at 800–1200° F. and at a pressure of 45–50 p.s.i.g. is sent through the inlet 128 into the housing 110. There the impeller blades 145 send it whirling out into the chamber 132. There it heats the tap water to about 290–300° F., and then the steam is recirculated by the fan blades 141 through the outlet conduit 148. The heated water and the steam soon sterilize the interior of the heater housing 110. The hot water, under pressure, flows into the conduit 115 and thence into the float chamber 181, which is kept at the same pressure as the chamber 132 by the tube 147. Thus the conduit 115 and float chamber 181 are sterilized.

At this time the water jacket 197 is empty, its inlet valve 198 being closed and its outlet 199 open to the drain. Hence, the hot water from the heater F courses through the devices I and J, sterilizing them. It continues through the conduit 200 to the valve 201, whence it passes out through the drain conduit 202 and back pressure valve 203, completing sterilization to this point.

Meanwhile, a source of superheated steam at between 300° F. and 400° F. is introduced through the conduit 205 and valve 204, sterilizing the other side of the valve 201 and the remainder of the conduit 200. This steam enters the manifold 300 and flows down through the pipes 306 and elbows 308 into the inlet valve 310, sterilizing all these parts. The assembly 211 is being rotated at this time, so that the pistons 270 are moving in their cylinders 260. The non-can no-fill apparatus is disengaged so that the valves 310 and 325 operate as though there were cans on the track 214, and therefore the steam passes through the valves 310 and 325 and the cylinder 260, completing sterilization of that portion of the device. Steam also enters the filling chamber 212 from the chamber 206 as well as from the valves 325 and sterilizes it.

At this time the valve 368 is open; and the water jacket 364 empty. Steam at about 15–20 p.s.i.g. from the conduit 370 passes through the reservoir 363 without condensing and thence flows through the pipes 362 and 360 into the chamber 256, sterilizing the inner ends of the pistons 270 and cylinders 260. Some steam, along with steam condensate formed in the chamber 256, is bled out through a valve 372, the orifice of which is of such size as to discharge all the condensate while at the same time maintaining the steam pressure in the chamber 256 at a level sufficient to maintain a temperature of about 250° F.

*Step 2: Changeover to normal operation.*—After sterilization of the chamber 256 has been assured, the valve 368 is closed and the valve 367 is opened to send cool water into the jacket 364, leaving via the conduit 366. The valve 372 is also closed. Soon the steam condenses in the reservoir 363 and builds up a supply of cool sterile water, which gradually cools off the chamber 256 and fills it with sterile water which is maintained under low pressure (2 to 5 p.s.i.g.) during subsequent operation by the pressure controller 371.

The sterilization of the entire system including the product heating unit F, the flow-control device G, the temperature-maintaining device I, the cooling means J, and the filler K having been completed, cooling water is admitted to the jacket 197 by opening the valve 198, the cooling water usually being recirculated through a valve 373 and conduit 374, with the valve 199 closed. The water flowing continuously under pressure from product heater F through the temperature-maintaining device I will thus be cooled in the cooling device J and discharged through the back-pressure valve 203 and drain conduit 202.

The flow of superheated steam from the conduit 205 is now stopped by closing the valve 204 and changing the three-way valve 201 to cause the cooled sterile water from the cooling device J to flow directly from the tube 200 through the manifold 300 to the plurality of filler tubes 306 and finally into and out of the cylinders 260 through the inlet and outlet valves 310 and 325. The no-can no-fill device 334 may now be made operative, and sterile cans may be introduced into the filler K from the sterilizer L.

Now the valve 34 is turned to send the liquid product 31 from the kettle 30 into the system. The hoppers 60 are already filled with solids, and the belt 62 now carries the solids into the mixer D. At first, as the food pushes out the tap water ahead of it, there is some dilution, so the first few cans R are thrown away.

*Step 3: Normal operation of the device of FIGS. 1 to 9.*—In normal operation, a liquid food component 31, preheated in the kettle 30 to any desired temperature, flows by gravity through the pipe 33, the valve 34, and the pipe 35 into the housing 40. Thence it flows via the conduit 45 and funnel 90 to the pump E. The desired level is maintained by the float 42 and its action on the butterfly valve 54, which closes as the liquid level rises and opens as the liquid level drops. Meanwhile, solids in the hopper 60 fall into the metering device 61, where they are fed through a blanching solution or live steam. The measured solids fall onto the belt 62 and are carried to the chute 94, whence they fall into the funnel 90. In the funnel 90, the liquid and solids are mixed together while the solids are prevented from bridging the pump inlet. The pump E, operated by the motor H, sends the mixture through the pipe 105 to the rotating inlet tube 117 of the product heater F.

As the mixture 104 pours out from the rotating spout 122, it flows gently down the walls 113 and 114 and is heated by superheated steam that is whirled circularly around in the chamber 132 by the fast-rotating impeller blades 145. The steam sweeps the surface of the product mixture without mixing with the product, and heat transfer occurs at the surface.

The heated product (at about 290° F. or within the 275° to 300° F. range) leaves the heater F through the conduit 115 and enters the float chamber 181. Its level here is dependent on the amount of product being dispensed by the filler K and the pumping rate of the pump E. The float 183 follows the product level, and when the float 183 rises or gets lower, it closes or opens the needle valve 187, which controls the device H to speed it up or slow it down. Variation of the speed of the device H controls the speed of the pump E and of the metering of the solid components of the mixture. As the level in the chamber 181 rises, the pump E and metering device slow down; when the level falls in the float chamber 181, they speed up. Also, by the effect of the pump speed on the liquid level in the float chamber 41, the valve 54 meters the liquid component. Thus, any change in the filling rate automatically controls the metering of the components into the heater F.

From the float chamber 181 the food product flows under the pressure exerted at the chamber 132 through the insulated tube 196 of the temperature-maintaining device I, where the high temperature is prolonged for the few seconds necessary to insure complete sterilization of the product 104. The sterilized product 104 is then cooled to the desired level (to avoid undesirable chemical effects) in the cooler J and passes to the filler K through the pipe 200. Since the valve 201 is used only during presterilization and since it offers no obstruction to free flow of the mixture 104 during normal operation, the system between the pump E and the filler inlet valves 310 may be considered valveless, as may the system before the pump E.

The cooled sterile product 104 enters the manifold 300 and flows via the pipes 306 to the inlet valves 310. The filler assembly 211 is always rotating; so some inlet valves 310 are open while others are closed, and vice versa; hence the product is always moving out of the pipe 200 and moves intermittently in the pipes 306.

As the assembly 211 rotates, the fingers 250 pick up empty sterile cans M from the star wheel 206 and carry them along the track 214 beneath an outlet spout 215. When any finger 250 fails to pick up a can M, for whatever reason, the no-can no-fill lever 345 is actuated and prevents the rollers 340 and 342 from opening the pertinent outlet valve 325 or closing the pertinent inlet valve 310. Otherwise, the rollers 340 and 342 engage the cams 331 and 330 successively to first close the inlet valve 310 just as the product flowing therethrough has filled the cylinder 260 and then to open the outlet valve 325, so that the piston 270 ejects the product 104 into the can M. Filling continues until the roller 343 closes the outlet valve 325 at the end of the outer stroke of the respective piston 270, the roller 341 immediately thereafter opening the inlet valve 310 to receive another charge of product into the cylinder 260.

Soon after the outlet valve 325 closes, the cam 252 reaches the flat part 253 of the cam track 228, and the finger 250 retracts slightly, slowing down the sterile can N filled with its sterile product, just as it makes the transfer from the track 214 to the outlet star wheel 217. From there, the can N passes by the conveyer O to the closing machine P, where it is closed under sterile conditions. Thence the closed cans R are carried away by the conveyer S.

*Brief General Description of a Modified Form of Filler K′ (FIGS. 10 and 11)*

Figure 10:
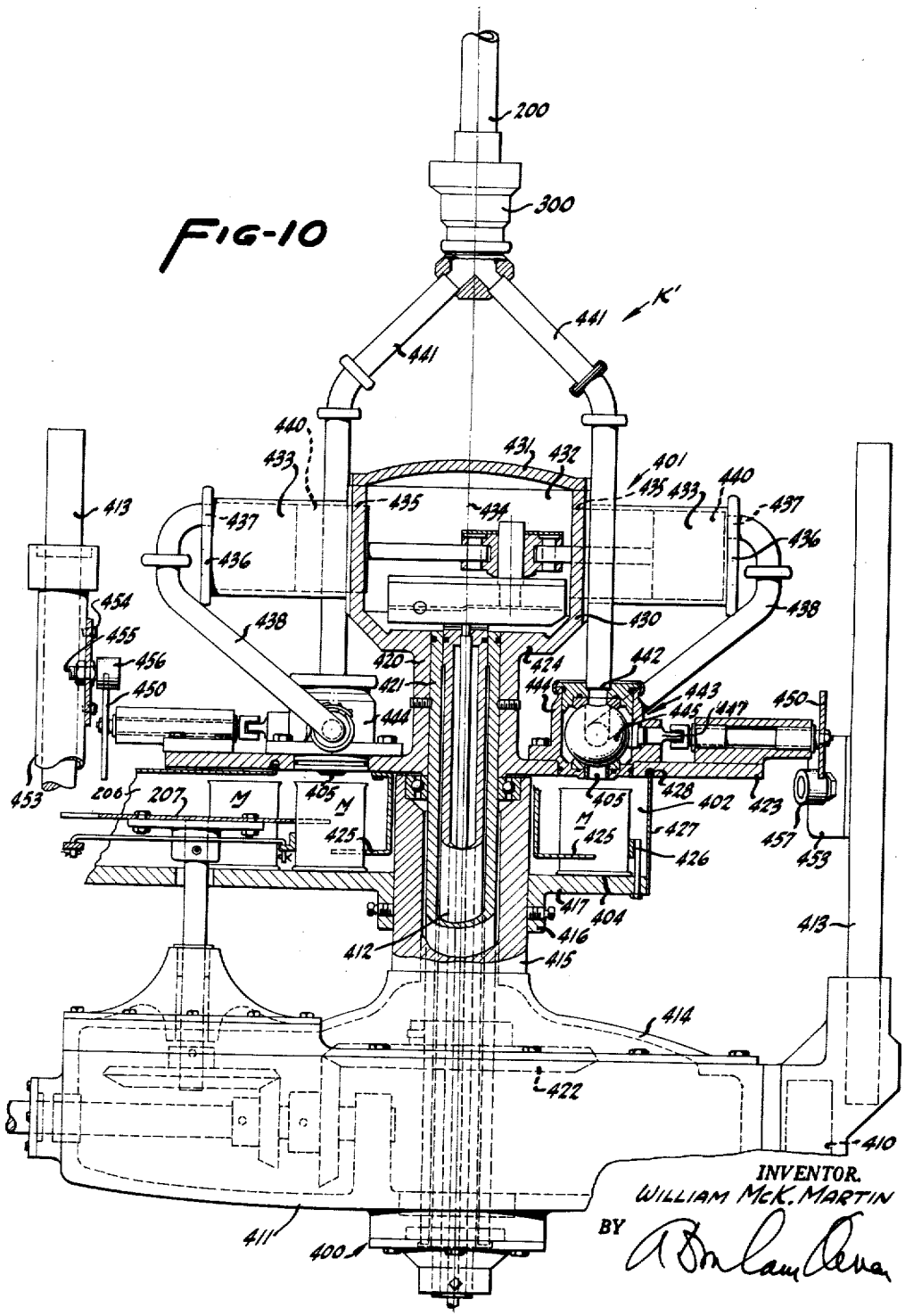
FIG. 10 is a view in elevation and partly in section, similar to FIG. 2, of a modified form of filling machine, also embodying the principles of this invention. Some parts have been broken off, to conserve space.

FIGS. 10 and 11 show a modified form of filler K′, generally like the filler K of FIGS. 1 to 9 but with some important differences. For one thing, the filler K′ is made to fill the cans M while they move at the same distance apart as they are on the star wheels 207 and 217. Thus, there is no need for the cam system 278, which was used to slow down the cans as they approach the star wheel 217, and all the mechanism associated with that cam system can be eliminated. For another thing, a single ball valve functions as the inlet valve and the outlet valve, instead of having the separate valves 310 and 325. The nature of these and other changes will become clear in the course of the following description.

In general, the modified form of filler K′ comprises a stationary main frame 400 and a rotating assembly 401 supported by the frame 400 and cooperating therewith to define a chamber 402 inside which sterile conditions are maintained, as by introducing a steady stream of steam from the container sterilizer L and the passage 206. Presterilized empty cans M or other suitable containers enter from the container sterilizer L via the enclosed sterile passage 206 and the star wheel 207. The star wheel 207 introduces each empty can M into the chamber 402 through an inlet opening 403, and the can M is carried around a stationary track 404 (supported by the frame 400) at the same spacing as that on the star wheel 207 while at all times being kept in alignment with a dispensing outlet 405 (FIG. 10). The can M travels approximately 270° along the track 404 and is then taken out as a filled can N at an outlet 406 by the star wheel 217 (or by fingers of a feed chain) and sent by the conveyer O to the closing machine P.

*The Filler Frame 400 (FIGS. 10 and 11)*

The stationary frame 400 may include a base 411, which supports a central vertical stationary tubular shaft 412 and a series of upright rods 413 that are spaced around the periphery of the filler K'. The base 411 also supports an annular gear housing member 414 with an upwardly extending bearing boss 415. Secured rigidly to the exterior of the boss 415 is an annular member 416 with a flange 417 whose upper surface provides the cam track 404.

*Rotation of the Housing Assembly 401 and the Star Wheels 207 and 217 (FIGS. 10 and 11)*

The rotating assembly or turret 401 includes an upper hub 420 secured to a rotating hollow vertical shaft 421 that is mounted rotatably around the shaft 412 and is provided with suitable bearings and fluid seals. The shaft 421 is provided near its lower end with a bevel gear 422, driven like the bevel gear 232, to cause rotation of the assembly 401 at the same speed as the star wheels 207 and 217.

The hub 420 has a lower flange 423 and an upper flange 424. Depending from the lower flange 423 are container-engaging fingers 425 that move the containers M around the track 404 while centering them beneath a filler outlet spout 405, also supported by the flange 423. The outlet spouts 405 lie at the same radius as do that centers of the cans M when they are driven by the star wheels 207 or 217, and the spouts 405 are spaced apart the same distance as the can centers are when the cans are driven by the star wheels 207 and 217; so cans M and N move at the same constant speed through the star wheels 207 and 217 and the filler K'. The fingers 425 propel them along between a stationary guide rail 426 and the boss 415. An annular wall 427 carried by the flange 417 completes enclosure of the sterile chamber 402, excess steam leaking out through the small clearance provided by a recess 428 into which the wall 427 extends somewhat.

The upper flange 424 supports a cup-shaped upper housing 430 that is closed by a sealed cover 431, enclosing a sealed chamber 432. The housing 430 and the upper flange 424 support a series of measuring cylinders 433.

*The Measuring Cylinders 433 and Their Pistons 440 (FIGS. 10 and 11)*

The radially mounted cylinders 433, in any suitable number, lie horizontally and symmetrically around a center 434 of the housing 430, about which the assembly 401 rotates. The radially inner end 435 of each cylinder 433 opens into the chamber 432, in which sterile fluid is normally retained during operation. The radially outer end of each cylinder 433 is closed by an end wall 436 except for an opening 437 at the top thereof, through which the food product enters and leaves. The opening 437 communicates with a conduit 438 that leads to a three-way valve 443.

Each cylinder 430 has a reciprocating piston 440 like the piston 270. The piston 440 faces the end wall 436 and is moved away from it to measure a charge of food product 104 in the cylinder 433 and then is moved toward it to dispense the charge, being driven like the piston 270 or in some other suitable manner.

*The Valves 433 (FIGS. 10, 11 and 18–20)*

The food product to be dispensed from the filler K comes via the tube 200 to the manifold 300, which is rotatably mounted on the end of the tube 200 by suitable antifriction bearings, and flows by tubes 441 to an inlet fitting 442 of each filler valve 443. The valve 443 has a housing 444 and comprises a ball 445 having a right angle passage 446 and a control stem 447, which is rotated to turn the ball 443 ninety degrees between a cylinder filling or measuring position and a cylinder-draining or can-filling position. The stem 447 extends through a bushing 448, which is provided with one or more O-rings 449 whose sealing action insures the maintenance of sterility inside the valve 443. The valve 443 will be described later in more detail.

*Operating and Synchronizing Structure for the Valve 443 (FIGS. 11 and 20)*

The valve 443 is moved between its two positions by a single generally triangular cam 450 mounted on its outer end. Each cam or valve trip lever 450 is like the levers 330 and 331 and has sloping or curved cam faces 451 and 452. On a pair of the standards 413 that project up from the base 411 of the main frame 400, are brackets 453, which are adjustable both vertically and rotatably by means of set screws 454 (FIG. 10). Each bracket 453 supports a shaft 455 on which is mounted a cam-engaging roller 456 or 457. The shaft 455 may be adjustably mounted on the bracket 453, as by means of a slot in the bracket.

The roller 456 is mounted just beyond the empty can inlet 403 to engage the upper cam surface 451 of the valve cam 450 to cause it to rotate the stem 447, thereby moving the valve 443 from its cylinder-filling position to a can-filling position as the cam 450 passes by the roller 456. Similarly, the roller 457 is mounted near the filled can outlet 406 at a lower altitude than the roller 456 to engage the lower cam face 452 of the valve cam 450 and move the valve 443 from its can-filling position back to its cylinder-filling position.

Since the shaft 455 for the cam roller 457 is stationary during operation of the device, it is adjusted to a proper position for maintaining synchronization with respect to the crankshaft, and this synchronization, once obtained, remains unchanged regardless of the distance from the crankshaft to the center 434. The bracket 453 for the roller 456 is mounted for movement like the bracket 335, so that the roller 456 may be swung outwardly to an inoperative position by the non-can no-fill lever 345.

*The Filling Cycle (FIGS. 10–11)*

As soon as the roller 457 has caused the cam 450 to move the valve 443 to its measuring position, the food product 104 flows under pressure into a cylinder 433. At this time the piston 440 has begun to move radially inwardly, and it continues its radially inward stroke until it reaches the inner limit of that stroke, thereby measuring the charge of food. At the very instant when the piston 440 reaches the inner limit of its stroke (crank on dead center), the valve 443 is moved by its cam 450 engaging the roller 456, assuming that an empty can M is below the outlet 405, and a charge of food is therefore accurately measured. During this cycle, the piston 440 has been moved only by the action of its crankshaft, so that the pressure of the liquid flowing into the cylinder 433 does not affect the piston 440, and similarly, the movement of the piston does not affect the back pressure of the product 104 in the tube 200. Movement of the valve 443 also does not affect the back pressure of the product 104 in the tube 200.

When the valve 443 closes off the inlet conduit 441, it connects the cylinder conduit 435 to the outlet 405, and the material inside the cylinder 433 is dispensed into the container M by the piston 440. It will be noted that an empty can M entered the inlet cycle at the inlet 403 before the inlet valve 443 was moved, so that it was already in position to receive the contents of the cylinder 433. Moreover, it will be noted that the filled can N exits after the valve 443 is closed, giving a sufficient time for any dripping that may occur, although normally with the ball valves of this invention there is no dripping. Moreover, the outlet 405 from the valve 443 is intentionally positioned as close as possible to the can M so that surface drainage is minimized.

During their filling the cans M are maintained in a sterile atmosphere inside the chamber 402, which is defined by the stationary can track 404, the vertical annular wall 427 secured to the can track 404, the rotating lower flange 423, and the boss 415. The narrow clearance between the wall 427 and the recess 428 permits limited outflow of steam, to maintain the filler chamber 402 at atmospheric pressure while also preventing entry of airborne bacteria. Initial sterilization and the changeover to operating conditions are accomplished as in the filler K.

*General Description of the Ball Valves of FIGS. 12 Through 23*

Figure 21:
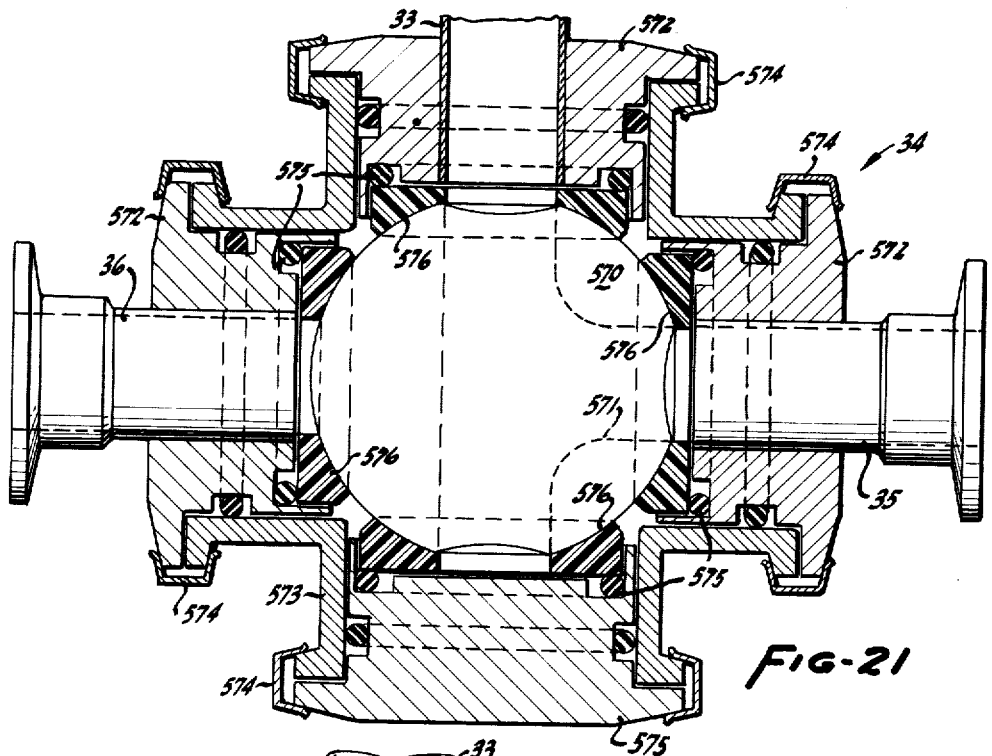
FIG. 21 is a view in elevation and in section of a T-type three-way valve embodying the principles of the invention.
Figure 22:
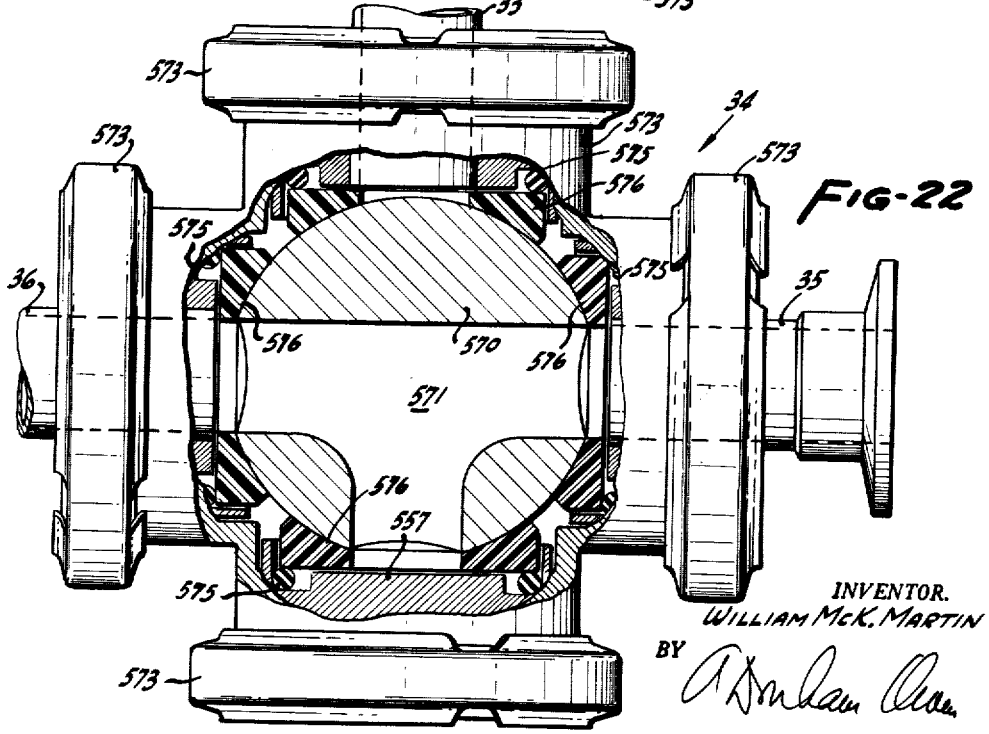
FIG. 22 is a similar view of the valve of FIG. 21 in a different position.
Figure 23:
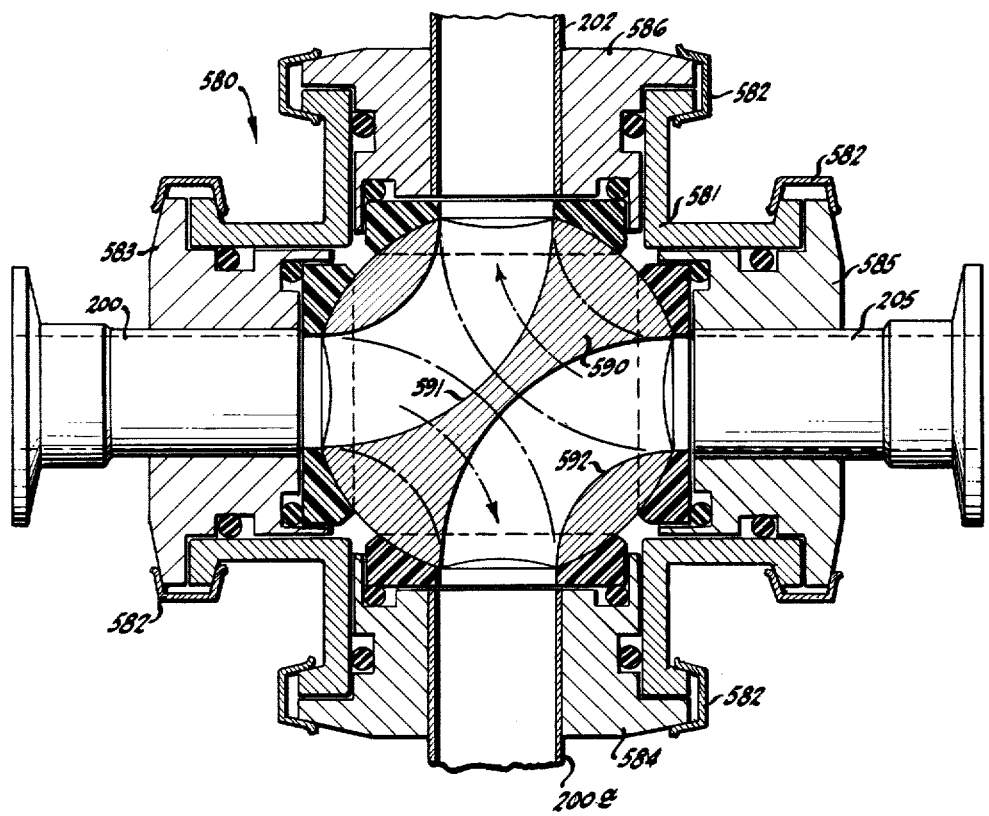
FIG. 23 is a view in elevation and in section of a four-way valve embodying the principles of the invention and shown as used in the line just prior to the filling machine. Broken lines show the valve in another position.

As stated earlier, an important feature of the invention is the provision of a superior kind of ball valve especially suitable for use in the canning industry. This new valve can readily be completely disassembled for cleaning, is readily reassembled, can be easily sterilized, and during use operates properly under high pressure conditions and under sterile conditions without contamination and without leakage. For purposes of illustration of the principles involved, four types of valves are shown. FIGS. 12 through 17 show a two-way valve 500 having a straight-through passage and used for simple on-off operation. The valve 500 is like the valves 310 and 325 shown in FIGS. 7 through 9 and may be used whenever a two-way valve of this type is desired. The valve 443 shown in FIG. 18 has a right-angle passage 446, and one example of its use has already been given, while FIGS. 21 and 22 show a valve 34 with a T passage for use in connecting the conduits 33, 35, and 36 in FIG. 1A. Finally, FIG. 23 shows a four-way valve 580 having two right-angle passages; it may be used in place of the valves 201 and 204, as will be described.

*The Two-Way Valve 500 of FIGS. 12–17*

The valve 500 has a generally spherical ball 501 with a straight-through passage 502 and a stem 503. The stem 503 has a flattened outer end portion 504 to which is secured a handle 505. The handle 505 is preferably made readily removable. It may be replaced by a cam, like those earlier described in connection with the valves 310 and 325.

An important feature of the valve 500 is the ease with which it is assembled and disassembled. To produce this result the valve housing is made of several pieces clamped together by conventional canners' clamps. As shown, there is a sleeve-like body 510 having flanged ends 511 and 512 and a tubular central boss 513 with a flanged end 514. Two end housing members 515 and 516, which may be identical, each have a straight through-passage 517 and are generally cylindrical exteriorly with a projecting annular flange 518, 519 which is clamped by a typical canning clamp 520, 521 (of the type used for sanitary tubing) to the annular flange 511, 512 on the body 510. O-rings 522 and 523 are mounted in grooves 524 and 525 and seal against the inner surface of the body 510. A stem housing member 526 fits in the boss 513 and has an exterior O-ring recess 527 for an O-ring 528 and has a flange 529 which is clamped to the flange 514 on the boss 513 by a clamp 530. Thus, when the three clamps 520, 521, and 530 are removed, the two end housing members 515 and 516 and the stem housing member 526 are easily removed from the body 510, yet they are normally held firmly together by the clamps 520, 521, 530, and the O-rings 522, 523, and 528 prevent leakage between them.

The stem housing member 526 has a stem passage 531 and has a lower end 532 with a recess 533 to receive an O-ring 534 which seals against a flattened portion 535 of the ball 501, and since the ball 501 rotates around in the same plane, this simple seal is adequate to prevent leakage.

The end housing members 515 and 516 have tubular extensions 539 that enclose and retain valve seats 540, while providing sufficient radial clearance to enable self-alignment of the valve seats 540. The outer end portion 541 of the extension is preferably flared for ease of assembly (FIG. 17). The valve seats 540 are preferably of Teflon or similar plastic composition and have concave spherical seats 542 to engage against the polished spherical surface of the ball 501, the other faces being flat or cylindrical. The housing members 515 and 516 each have an end wall 543 opposite one flat face 544 of the valve seat 540, and the wall 543 is provided with a groove 545 to receive an O-ring 546 which is substantially thicker than the depth of the groove 545 and substantially thinner than the width of the groove 545. Therefore, there is always a clearance space 547 between the valve seat 540 and the end wall 543. This space 547 enables liquid to get in and to pass into the O-ring recess 545 and exert hydrostatic pressure against the O-ring 546 and also against the wall 544 of the valve seat 540. This hydrostatic pressure increases the tightness of the seal between the valve seat 540 and the sperical surface of the ball 501 as the fluid pressure increases.

The O-ring 546 seals between the flat face 544 of the valve seat 540 and the cylindrical wall 548 of the groove 545. The hydrostatic pressure exerted on the O-ring 546 tightens this seal, too, and is transmitted to the back side 544 of the valve seat 540 to further increase the tightness of seal between the surface 542 and the spherical surface of the ball 501. Although the movements of the O-ring 546 and valve seat 540 are very small, the hydrostatic pressure transmitted by them is very effective in preventing leakage. The seat 540 with its accompanying O-ring 546 are thus pushed like a piston against the ball 501 by the hydrostatic pressure of the fluid.

The magnitude of the pressure of the valve seat 540 against the sperical surface of the valve 501 depends on how much the area of the face 544 is subjected to hydrostatic pressure. The maximum hydrostatic pressure on the valve seat 540 is obtained when the outside diameter of the O-ring groove 545 is the same as the outside diameter of the valve seat 540, as in the valve 500 of FIGS. 12–17, so that the entire back face 544 is subjected to hydrostatic pressure. When this pressure is too great, it can be reduced by using smaller O-rings and grooves, as in FIGS. 18 and 19.

The valve 500 may be installed in any line, irrespective of the direction of flow or pressure, for it is equally tight in both directions due to the applicability here of Pascal's law.

Moreover, the hydrostatic pressure and piston-like action of the O-ring act to produce a tight seal at all times, so that the valve seat 540 is self-aligning. Wear and warpage result in the hydrostatic pressure shifting the valve seat 540 into the position where it seals most tightly.

One further feature should be mentioned. Even at zero pressure, no metal back-up spring is used to maintain the valve seat 540 in tight contact with its ball 501, for the O-rings 546 themselves are compressed sufficiently to maintain a tight seal there.

Figure 18:
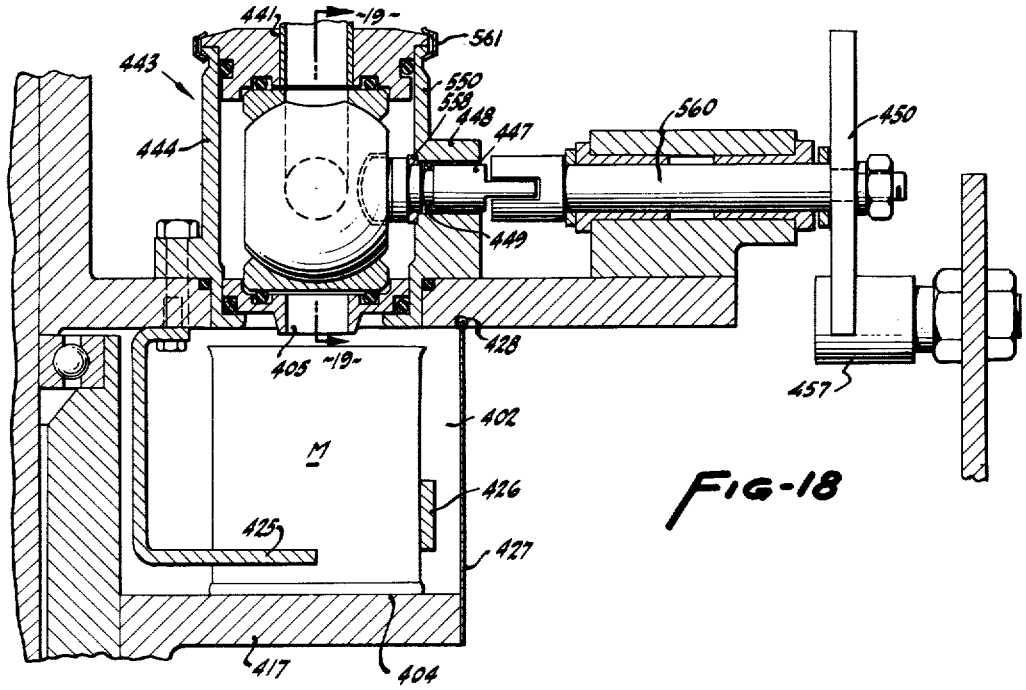
FIG. 18 is a view in side elevation, partly in section, of a portion of the machine of FIG. 10 showing a novel three-way valve embodying the principles of the invention.
Figure 19:
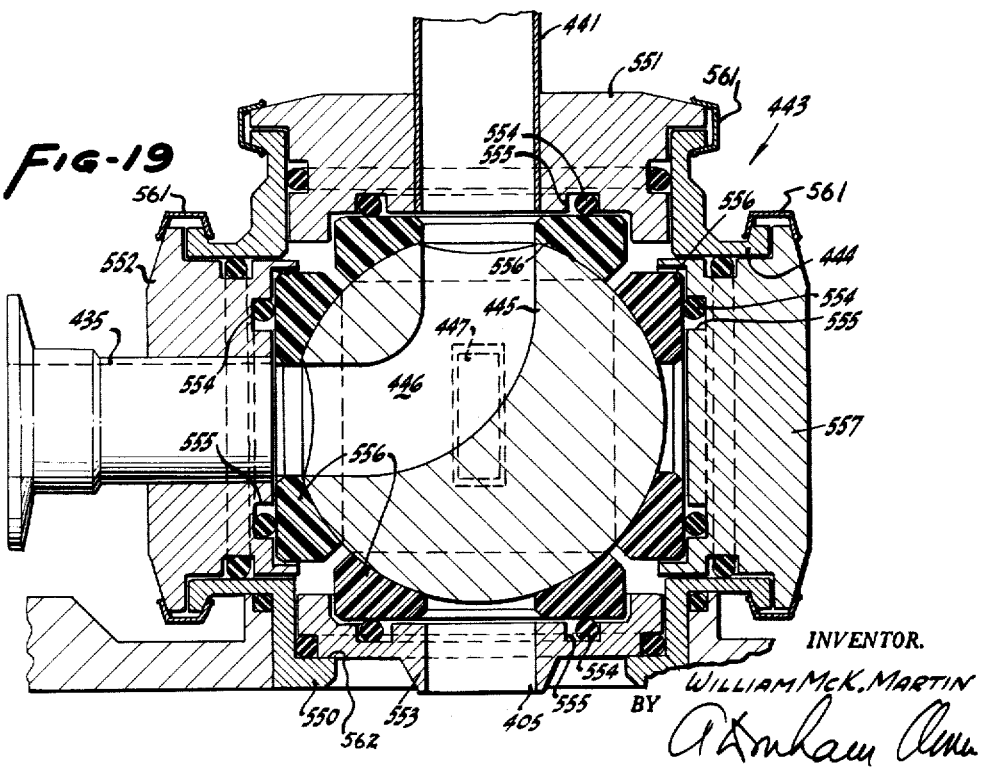
FIG. 19 is an enlarged view in section taken along the line 19—19 in FIG. 18, the valve being in the measuring position.
Figure 20:
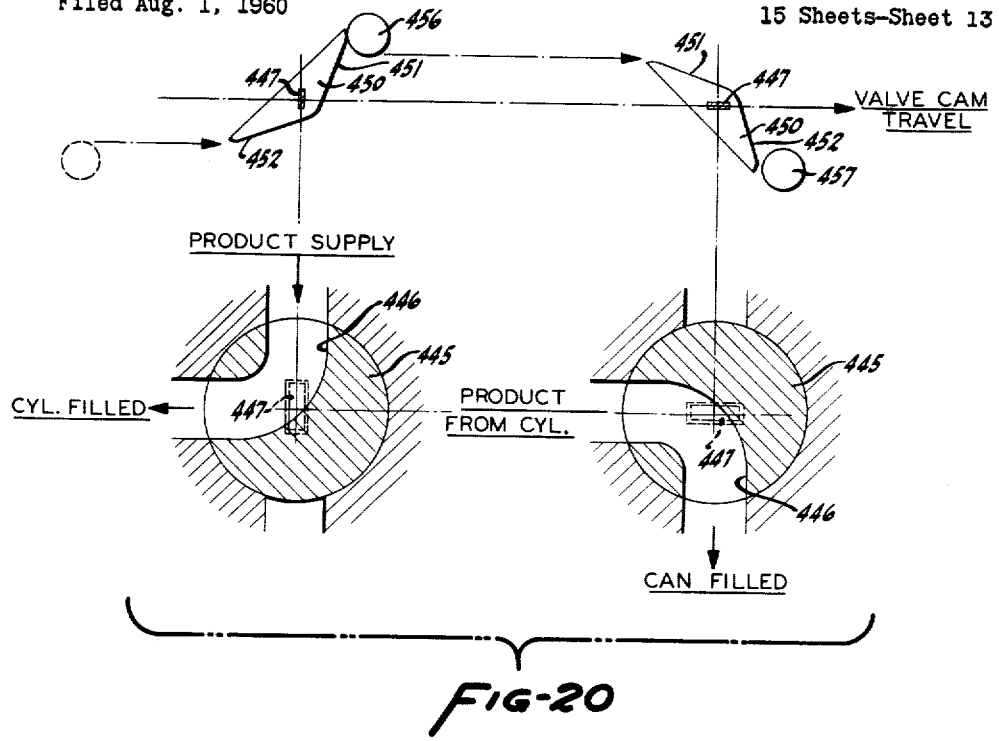
FIG. 20 is a diagrammatic view showing how the cam system rotates the valve of FIG. 18, 90° from its measuring position to its can-filling position.

*The Valve 443 of FIGS. 18 and 19*

The valve 443 has already been described in part, many of its other features are substantially the same as corresponding ones in the valve 500. It has a body 550 with suitable bosses and passages. It has three housing members 551, 552, and 553 which are very similar to the end housing members 515 and 516 in the valve 500, the principal differences being the extreme shortness of the member 553 that provides the outlet 405 and the use of narrower diameter O-rings 554 and grooves 555 throughout, to avoid excessive pressures acting on the valve seats 556. There are four valve seats 556, a fourth housing member 557 being solid rather than tubular, but also having a groove 555 and O-ring 554. Operation of the O-rings 554 and Teflon valve seats 556 is otherwise the same as in the valve 500.

The valve stem 447 may have a housing member like the member 526 in the valve 500 or as shown, it may be a part of the body 550, an O-ring 449 and a Teflon thrust washer 558 being used to obtain the desired leaktightness. The stem 447 may be prolonged to directly engage the lever 450, but as shown, an extension stem 560 may be used, being suitably linked. As before, conventional canning clamps 561 hold the valve housing together. The member 553 simply rests on an interior shoulder 562 of the body 550.

The Valve 34 of FIGS. 21 and 22

The valve 34 of FIGS. 21 and 22 includes a ball 570 having a T passage 571 but otherwise operated by a 90-degree turn with the stem (not shown) in the same manner as the two valves 500 and 443 previously described. There are three identical housing members 572, and a fourth member 575, a closed member, as in the valve 443, all fitting in a body 573 of suitable configuration and held there by clamps 574. There are O-rings 575 and valve seats 576, acting as before. When the valve 34 is in the position shown in FIG. 21, the conduit 33 (FIG. 1A) is connected to the conduit 35, and this is the position used during normal operation. However, with a 90-degree twist, the valve is turned to the position shown in FIG. 22, in which the conduit 36 is connected to the conduit 35. In that latter position, cold water from the conduit 36 is sent into the conduit 35 during sterilization, as described heretofore. Otherwise, operation is the same as in the valve 443.

The Valve 580 of FIG. 23

FIG. 23 shows a valve 580 generally resembling those already shown, so far as the use of O-rings, ball valve, and valve seats are concerned. A body 581 is secured by clamps 582 to four identical housing members 583, 584, 585, and 586, all like those heretofore described. Its ball 590 has two rightangle passages 591 and 592 which are maintained separate from each other. This valve 580 may be used in a sterilizing operation to replace the valves 201 and 204. Once again, the function of the valve seats, the O-rings, and the hydrostatic pressure remains the same. The valves are again self-aligning, self-sealing, and easily disassembled for cleaning.

The housing 583 is connected by the product pipe 200 to the cooling tube J, while the housing 584 is connected by a pipe 200a to the filler K or K'. The housing 585 is connected to the steam pipe 205, and the housing 586 is connected to the drain pipe 202 (see FIG. 1B). During normal operation (broken-line position) the passage 591 connects the pipes 200 and 200a for product flow, while the passage 592 connects the pipes 205 and 202 for steam sterilization maintenance of the valve 580. During preparatory sterilization (solid-line position), the passage 591 connects the product pipe 200 to the drain pipe 202, to drain away the hot water therein, as previously described, while superheated steam from the pipe 205 is sent into the pipe 200a for use in sterilizing the filler K or K' and the product lines therein.

Thus it will be seen that no matter whether the valve be a two-way, three-way, or four-way valve, the principles of this invention may be applied to achieve sterile operation in a canning system or the like, with hydrostatic pressure being used by its valve seats and O-rings to prevent leakage at all pressures.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A filling machine for an aseptic canning system, including in combination: a stationary housing; a rotating assembly cooperating with said housing to provide an annular can-filling chamber; means for maintaining said can-filling chamber in a sterile condition; a can track in said can-filling chamber having a can inlet and a can outlet; an inlet manifold on said assembly; a plurality of radially extending measuring cylinders on said assembly, each with a radially reciprocating piston and an outer end toward and away from which said piston moves, and an inner end; a control valve for each cylinder with a first conduit connected to said cylinder, a second conduit connected to said manifold, a vertical outlet opening; a central chamber enclosing the inner ends of said cylinders; means for filling said central chamber with sterile fluid; means on said rotating assembly for picking up at said can inlet one can and retaining it immediately beneath said vertical outlet opening while impelling said can around said track to said can outlet; and two valve-actuating means for operating said control valve cyclically, comprising (1) means for closing off said second conduit from said first conduit when its associated piston reaches the inner limit of its stroke and immediately thereafter connecting said first conduit to said outlet opening to dispense said mixture, and (2) means for closing off said first conduit from said outlet opening at the radially outer limit of the stroke of its associated piston and immediately thereafter connecting said first conduit to said second conduit.

2. A filler for an aseptic canning system having an inlet manifold, a plurality of measuring cylinders, each with a piston and an end toward and away from which said piston moves to measure said product, said cylinder having off-on inlet means and off-on outlet means adjacent said end, means for reciprocating said pistons in said cylinders, means for cyclically and sequentially (1) closing said inlet means when its associated piston reaches the inner limit of its stroke, (2) opening said outlet means immediately after closure of said inlet means to dispense said mixture, (3) closing said outlet means at the radially outer limit of the stroke of its associated piston, and (4) opening said inlet means, and conduit means for connecting said cylinder inlet means of all said cylinders at all times to said manifold, said filler having in combination therewith:
 means for sterilizing said cylinder initially on each side of said piston and for initially sterilizing all the said off-on means,
 means for introducing sterile fluid on the opposite side of said piston from said off-on means at all times to maintain said cylinder in a sterile condition,
 means enclosing said outlet means in a filling enclosure, and
 means for maintaining said enclosure in a sterile condition.

3. A filling machine of the type having a stationary housing, a rotating assembly cooperating with said housing to provide an annular can-filling chamber, a can track in said can-filling chamber having a can inlet and a can outlet, an inlet manifold on said assembly, a plurality of radially extending filling cylinders on said assembly, each with a radially moving piston and an outer end toward and away from which said piston moves, each said cylinder having valve means with an inlet connected to said manifold and an outlet leading directly to said can-filling chamber, piston-reciprocating means, means on said rotating assembly for picking up at said can inlet one can and retaining it immediately beneath said valve outlet while impelling said can around said track to said can outlet, and means for cyclically (1) closing said valve inlet when its associated piston reaches the inner limit of its stroke, (2) opening said valve outlet immediately after closure of said valve inlet to dispense said mixture, (3) closing said valve outlet at the radially outer limit of the stroke of its associated piston, and (4) opening said valve inlet immediately after closure of said valve outlet, said filling machine having in combination therewith:
a central chamber enclosing the inner ends of said cylinders,
means for sterilizing said central chamber and each said cylinder initially on each side of its said piston and for initially sterlizing all the passages therefrom to said inlet and outlet valves,
means for introducing sterile fluid into said central chamber and from there into each said cylinder on the opposite side of each said piston from its said valve means at all times to maintain said cylinder in a sterile condition,
and means for maintaining said can-filling chamber in a sterile condition.

4. The filling machine of claim 3 wherein said pistons are each provided with circumferential grooves near each end, a resilient O-ring in the groove nearer the end toward and away from which said piston moves, and a Teflon band in the groove nearer the other end, said piston riding in said cylinder and said O-ring and band.

5. The filling machine of claim 4 wherein said Teflon band comprises a strip whose ends do not meet in said groove, thereby helping to equalize the pressure on the opposite sides of said O-ring.

6. The filling machine of claim 3 having a stationary crankshaft in said central chamber positioned on said assembly eccentrically with respect to the center about which said assembly rotates, a plate mounted rotatably on said crankshaft, and rods, each connecting a said piston rotatably to said plate and comprising the means for reciprocating said pistons.

7. The filling machine of claim 6 having means for varying the eccentricity of said crankshaft.

8. A filling machine of the type having a stationary housing, a rotating assembly cooperating with said housing to provide an annular can-filling chamber, a can track in said chamber having a can inlet and a can outlet, an inlet manifold on said assembly, a plurality of radially extending filling cylinders on said assembly, each with a radially moving piston and an outer end toward and away from which said piston moves, each said cylinder having valve means providing an inlet connected to said manifold and an outlet leading directly to said chamber, piston-reciprocating means, means on said rotating assembly for picking up at said can inlet one can and retaining it immediately beneath said valve outlet while impelling said can around said track to said can outlet, and valve operating means for cyclically (1) closing said valve inlet when its associated piston reaches the inner limit of its stroke, (2) opening said valve outlet immediately after closure of said valve inlet to dispense said mixture, (3) closing said valve outlet at the radially outer limit of the stroke of its associated piston, and (4) opening said valve inlet immediately after closure of said valve outlet, characterized by:
at least one valve-operating cam for each said valve means,
first cam-actuating means on said housing adjacent said can inlet, and
second cam-actuating means on said housing adjacent said can outlet, said first and second cam-actuating means engaging said cams to perform the opening and closing sequence and comprising said valve operating means.

9. The filling machine of claim 8 having
a lever rotatably mounted on said housing for engagement with cans entering said track from said can inlet for moving said cam-actuating means near the inlet into cam-operating position, and
means urging said lever to move the same said cam-actuating means into inoperative position in the absence of a can, so that when no can is beneath an outlet, its said valve means does not send fluid out from said outlet.

10. The filling machine of claim 8 wherein said cams are shaped generally like a flat isosceles triangle, with the equal sides being the ones to engage said cam-actuating means, the two cam-actuating means for each cam being positioned at different heights to rotate said cam.

11. A filling machine of the type having a stationary housing, a rotating assembly cooperating with said housing to provide an annular can-filling chamber, a can track in said chamber having a can inlet and a can outlet, an inlet manifold on said assembly, a plurality of radially extending filling cylinders on said assembly, each with a radially moving piston and an outer end toward and away from which said piston moves, each said cylinder having valve means with an inlet connected to said manifold and an outlet leading directly to said chamber, piston-reciprocating means, and means for cyclically (1) closing said valve inlet when its associated piston reaches the inner limit of its stroke, (2) opening said valve outlet immediately after closure of said valve inlet to dispense said mixture, (3) closing said valve outlet at the radially outer limit of the stroke of its associated piston, and (4) opening said valve inlet immediately after closure of said valve outlet, said filling machine comprising in combination therewith:
means on said rotating assembly for picking up at said can inlet one can and retaining it immediately beneath said valve outlet while impelling said can around said track to said can outlet,
said means for picking up cans and impelling them, comprising
a series of fingers pivotally mounted on said assembly and having a crank with a cam roller,
said housing having a cam track engaged by said roller and shaped to retard said finger as it approaches said cam outlet.

12. A can-filling machine comprising a stationary frame having a can track with an input and an output; a plurality of filling cylinders, each with a piston and an outer end toward which and away from which said piston moves; drive means for each piston; feed means for supplying the substance with which the cans are to be filled; a cylinder inlet valve connecting a said outer end of each said cylinder to said feed means; a cylinder outlet valve from said outer end of each said cylinder leading to a point over said track, so that the contents of said cylinder are dispensed into a can on said track; means for aligning the can on said track with respect to said cylinder outlet valve; first means for closing said inlet valve when its associated piston reaches the inner limit of its stroke; second means for opening said outlet valve immediately after closure of said inlet valve by said first means; third means for closing said outlet valve at the radially outer limit of the stroke of its associated piston; fourth means for opening said inlet valve immediately after closure of said outlet valve; means for sterilizing each said cylinder initially on each side of its said piston and for initially sterilizing all the passages therefrom to said inlet and outlet valves; means for introducing sterile fluid on the opposite side of each said piston from its said valve means at all times to maintain said cylinder in a sterile condition; means enclosing said can track and said outlet valves in a filling enclosure; and means for maintaining said enclosure in a sterile condition.

References Cited in the file of this patent

UNITED STATES PATENTS

| | | |
|---|---|---|
| 272,616 | Annibale | Feb. 20, 1883 |
| 1,330,429 | Campbell | Feb. 10, 1920 |
| 1,434,766 | Babcock | Nov. 7, 1922 |
| 1,439,858 | Babcock | Dec. 26, 1922 |
| 1,670,691 | Riggin | May 22, 1928 |
| 1,746,609 | Schellin | Feb. 11, 1930 |
| 1,914,736 | Coutou | June 20, 1933 |
| 2,195,441 | Bagby | Apr. 2, 1940 |
| 2,209,315 | Ball | July 30, 1940 |
| 2,321,994 | Capman | June 15, 1943 |
| 2,450,248 | Morgan et al. | Sept. 28, 1948 |
| 2,578,732 | Nordquist | Dec. 18, 1951 |
| 2,600,391 | Cabot | June 17, 1952 |
| 2,661,699 | Smith | Dec. 8, 1953 |
| 2,756,916 | Kerr | July 31, 1956 |
| 2,761,605 | Pahl et al. | Sept. 4, 1956 |
| 2,861,773 | Clade | Nov. 25, 1958 |
| 2,862,528 | Geisler | Dec. 2, 1958 |

UNITED STATES PATENT OFFICE

CERTIFICATE OF CORRECTION

Patent No. 3,101,752            August 27, 1963

William McK. Martin

It is hereby certified that error appears in the above numbered patent requiring correction and that the said Letters Patent should read as corrected below.

Column 3, line 67, for "stainding" read -- standing --; line 69, for "mainain he" read -- maintain the --; column 4, line 4, for "morevover" read -- moreover --; column 5, line 37, for "togther" read -- together --; column 6, line 62, for "serilization" read -- sterilization --; line 73, for "labler" read -- labeler --; column 7, line 63, after "Pump" insert -- E --; column 16, line 62, for "non-can" read -- no-can --; column 20, line 41, for "a can-filling" read -- its can-filling --; column 24, line 16, for "mtaintaining" read -- maintaining --; column 25, line 34, for "and said O-ring" read -- on said O-ring --.

Signed and sealed this 2nd day of June 1964.

(SEAL)
Attest:

ERNEST W. SWIDER
Attesting Officer

EDWARD J. BRENNER
Commissioner of
Patents